June 4, 1940. A. T. KOPPE 2,203,094
CONTROL SYSTEM FOR PHOTOCOMPOSING MACHINES
Filed Aug. 22, 1936 11 Sheets-Sheet 1
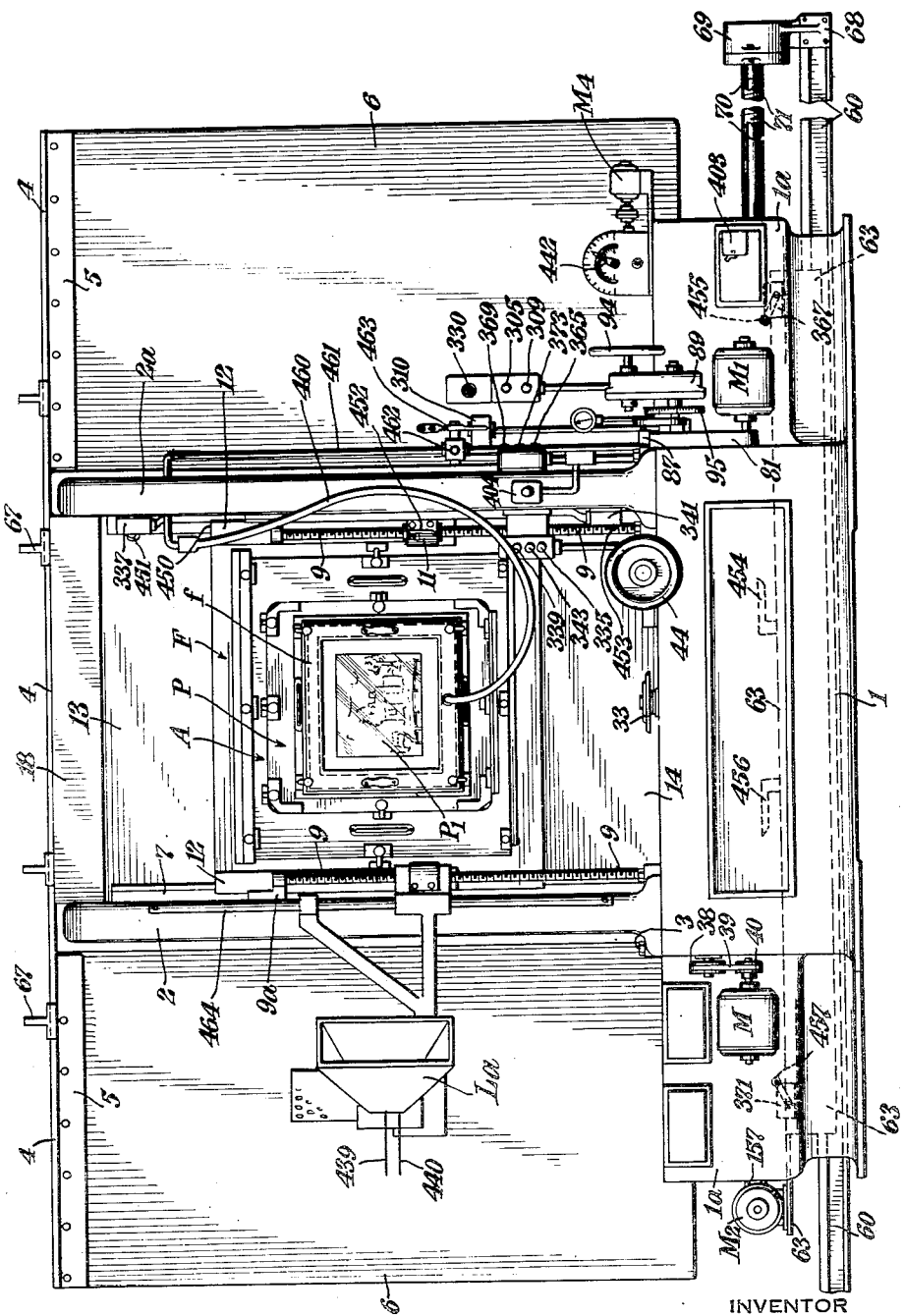
INVENTOR
Alexander T. Koppe
BY
Ward, Crosby & Neal
ATTORNEYS

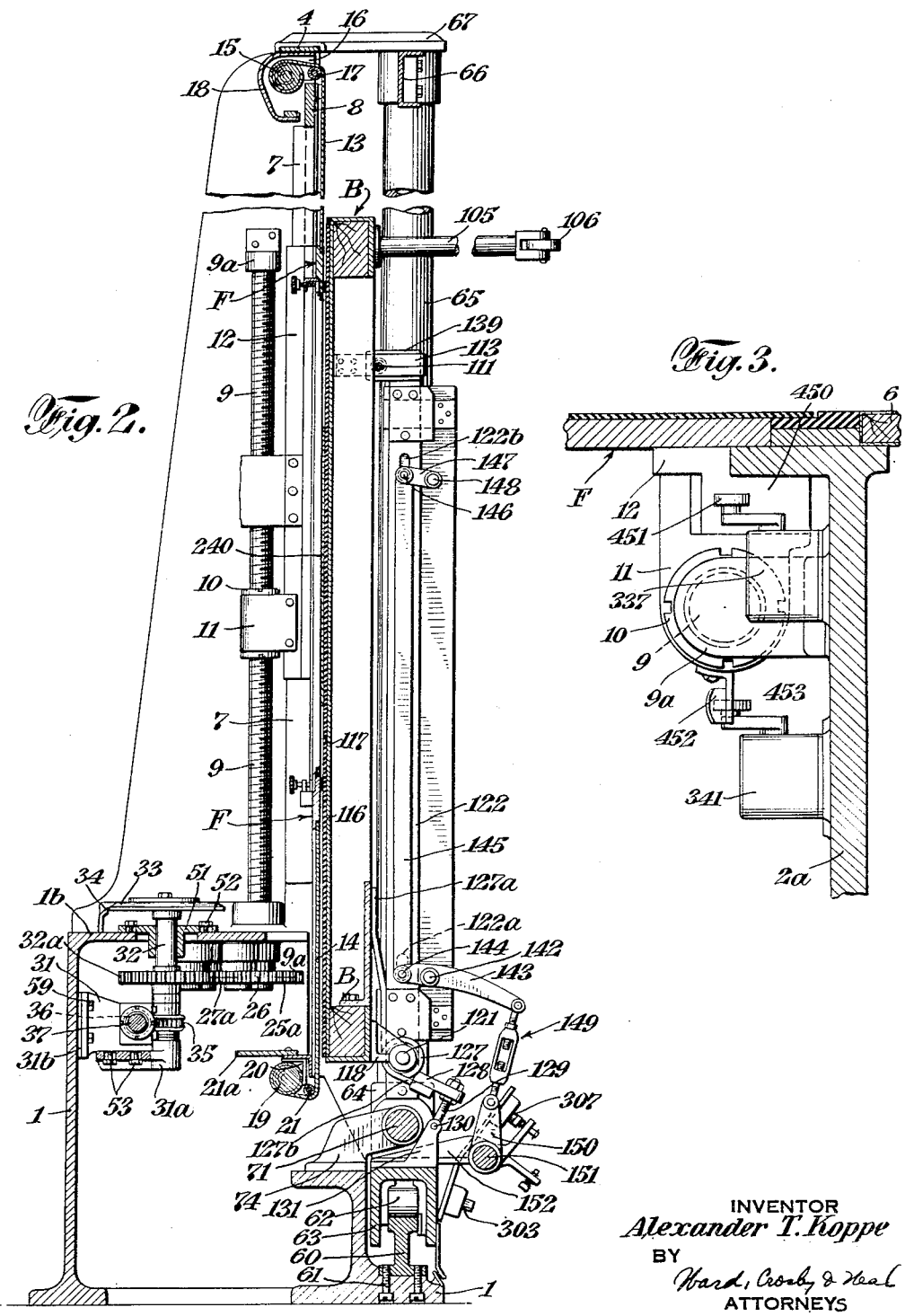

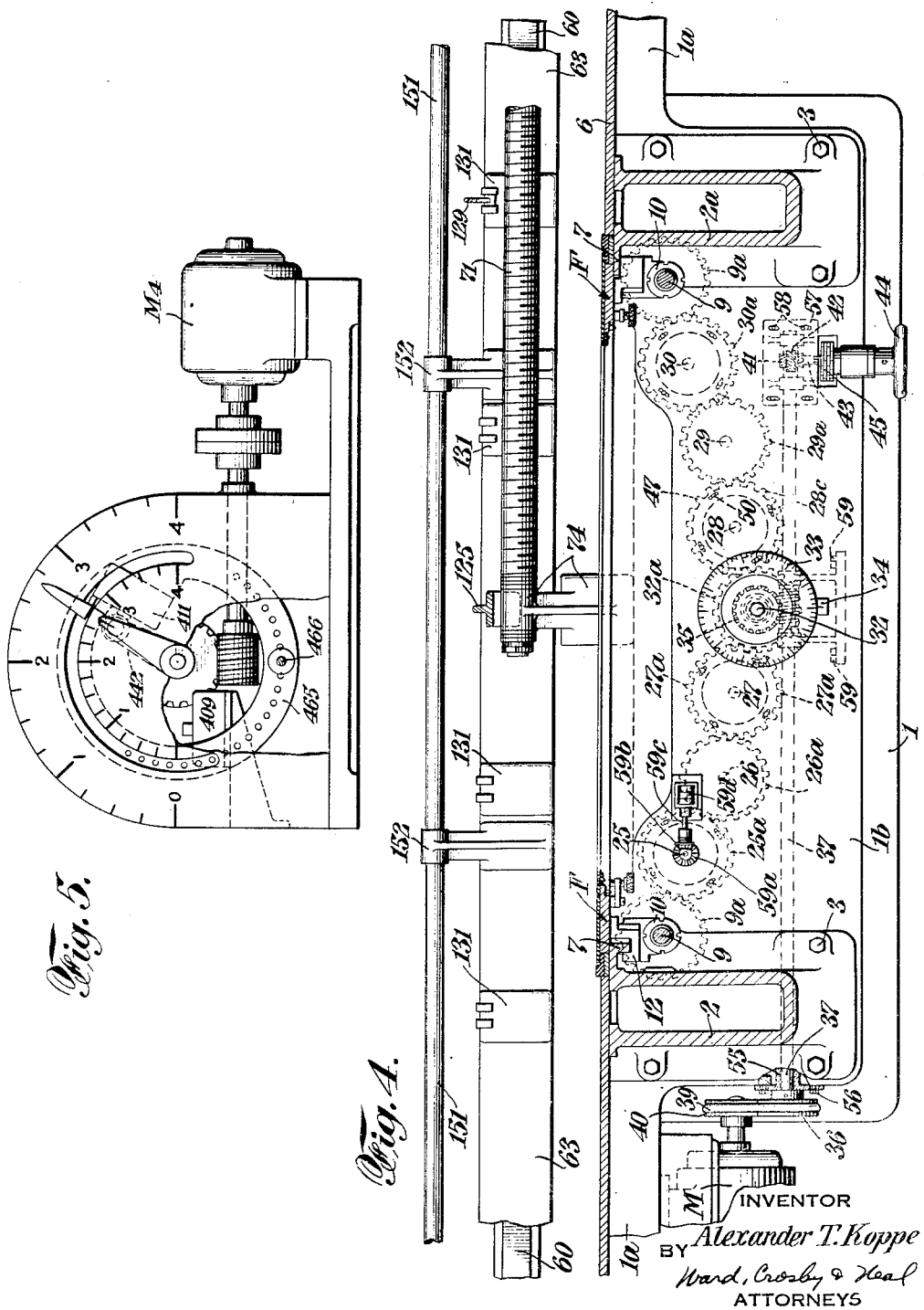

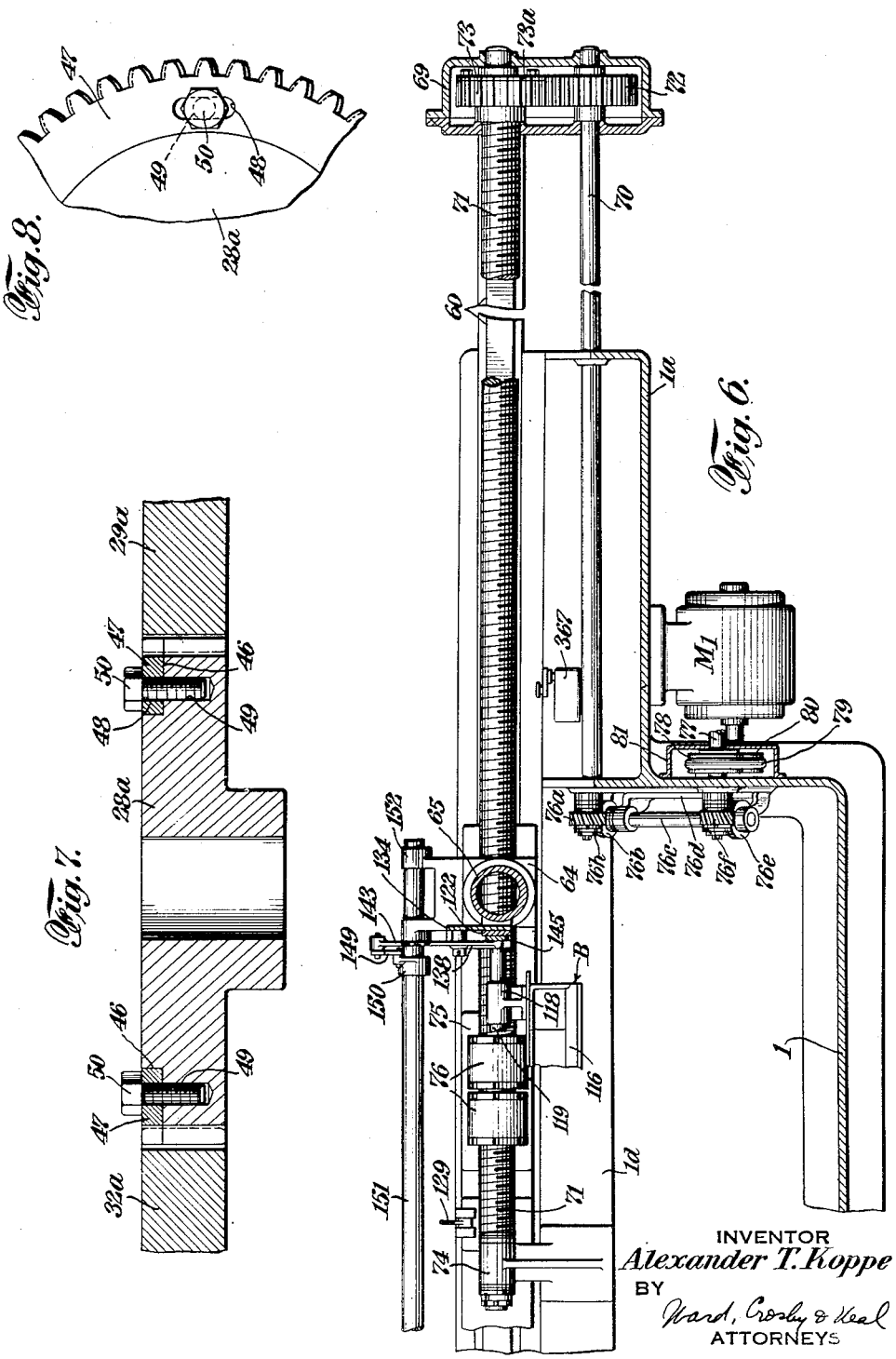

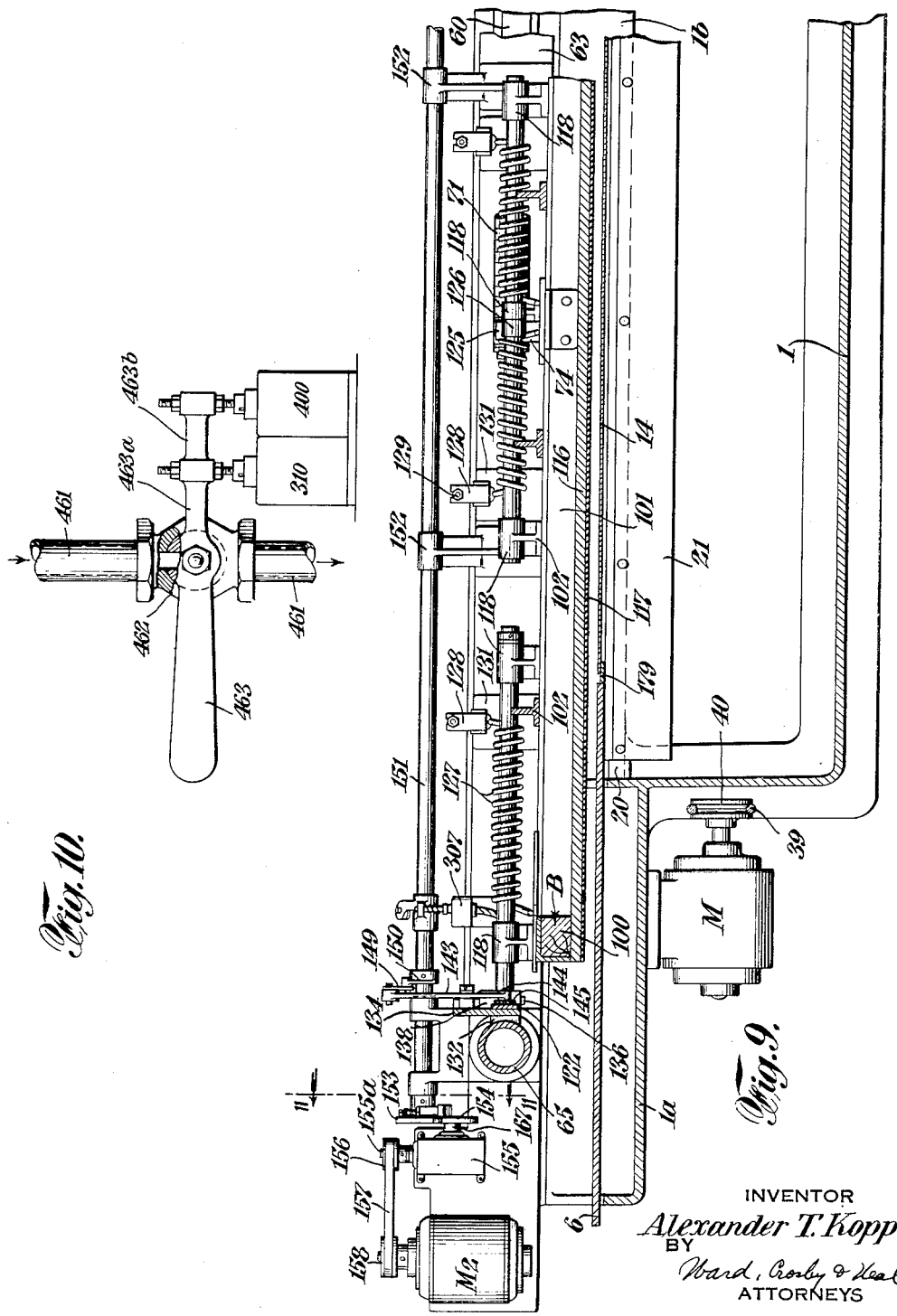

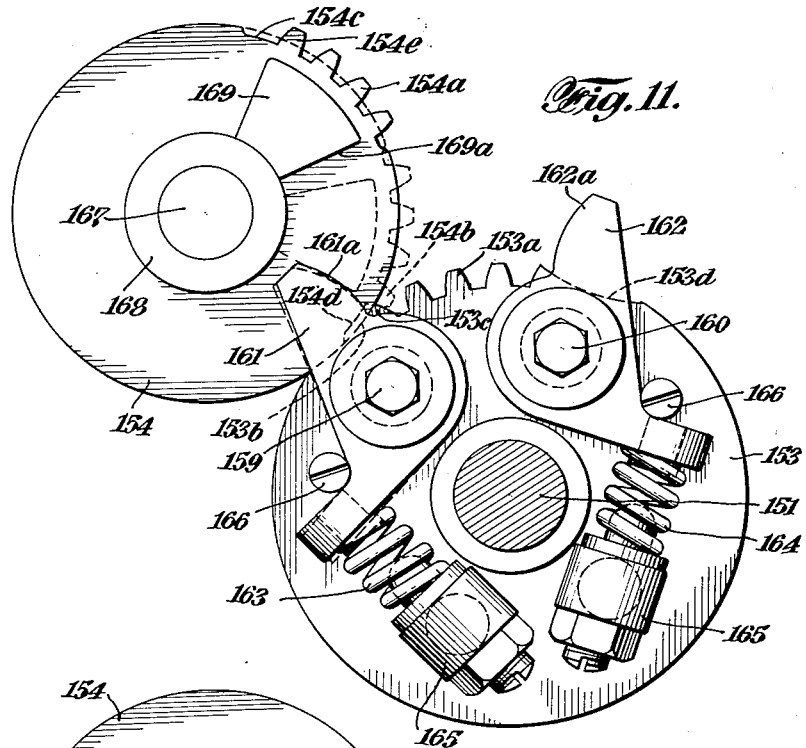
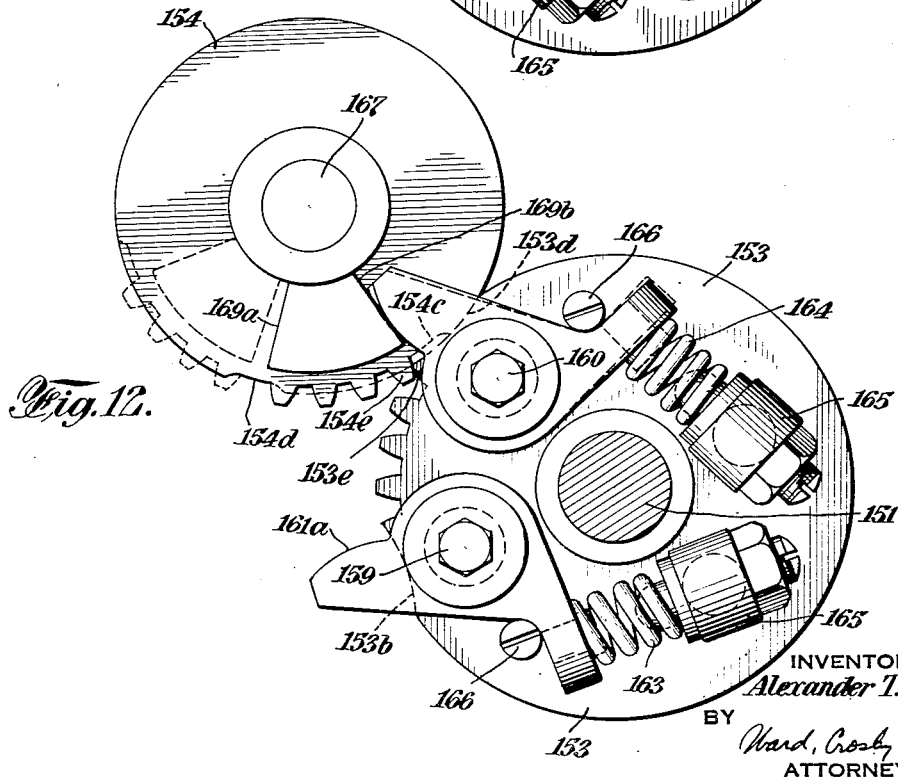

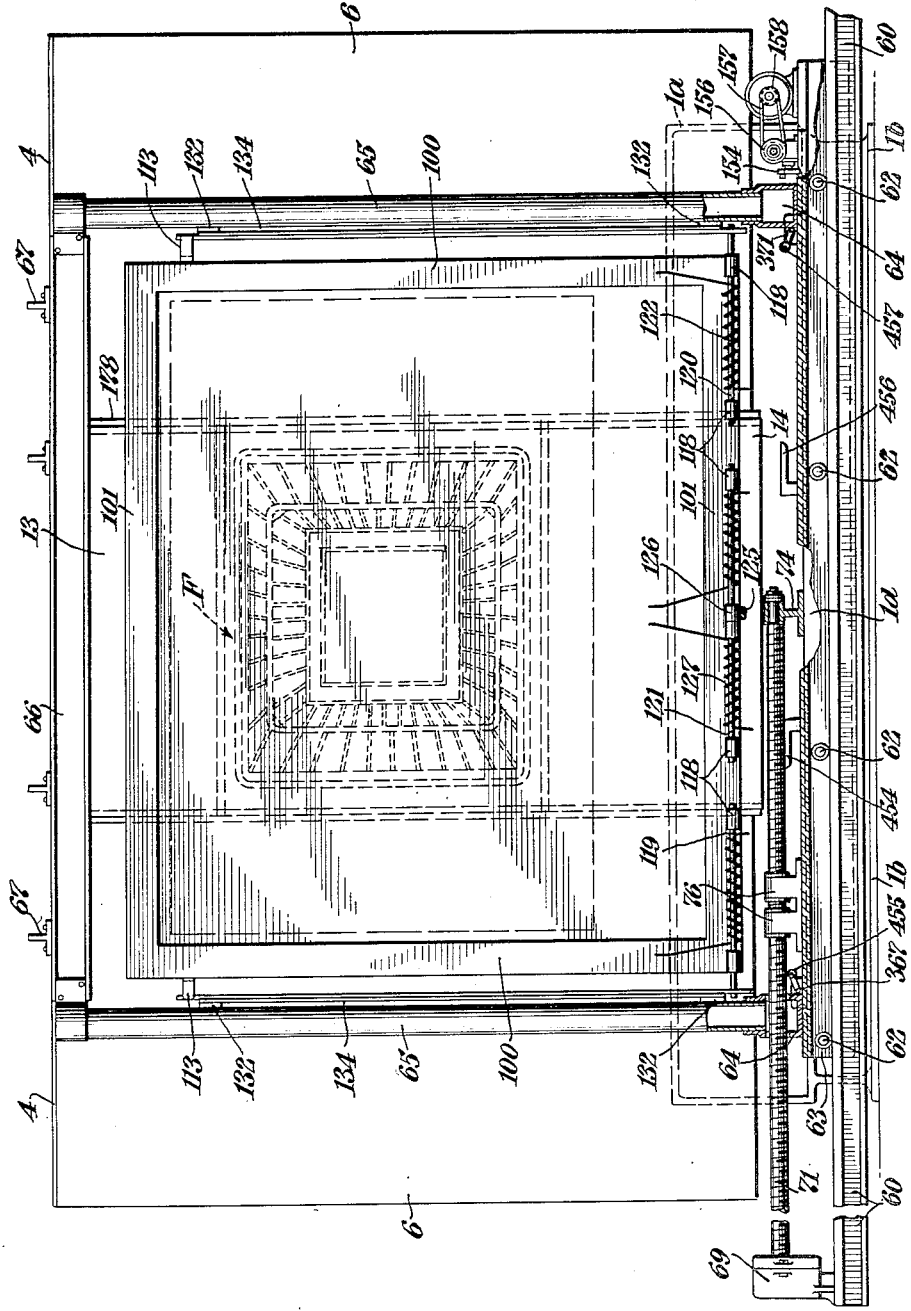

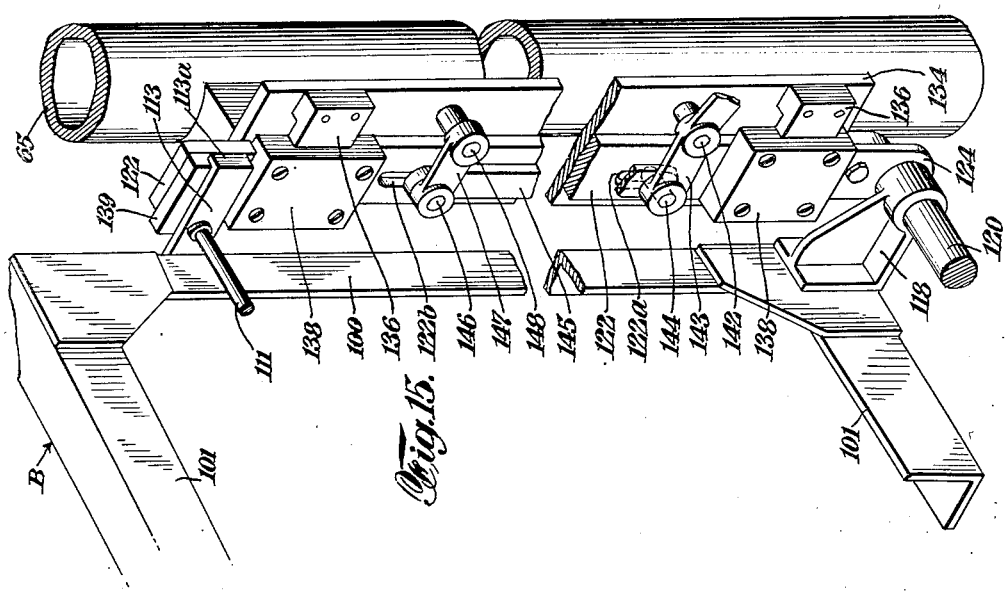

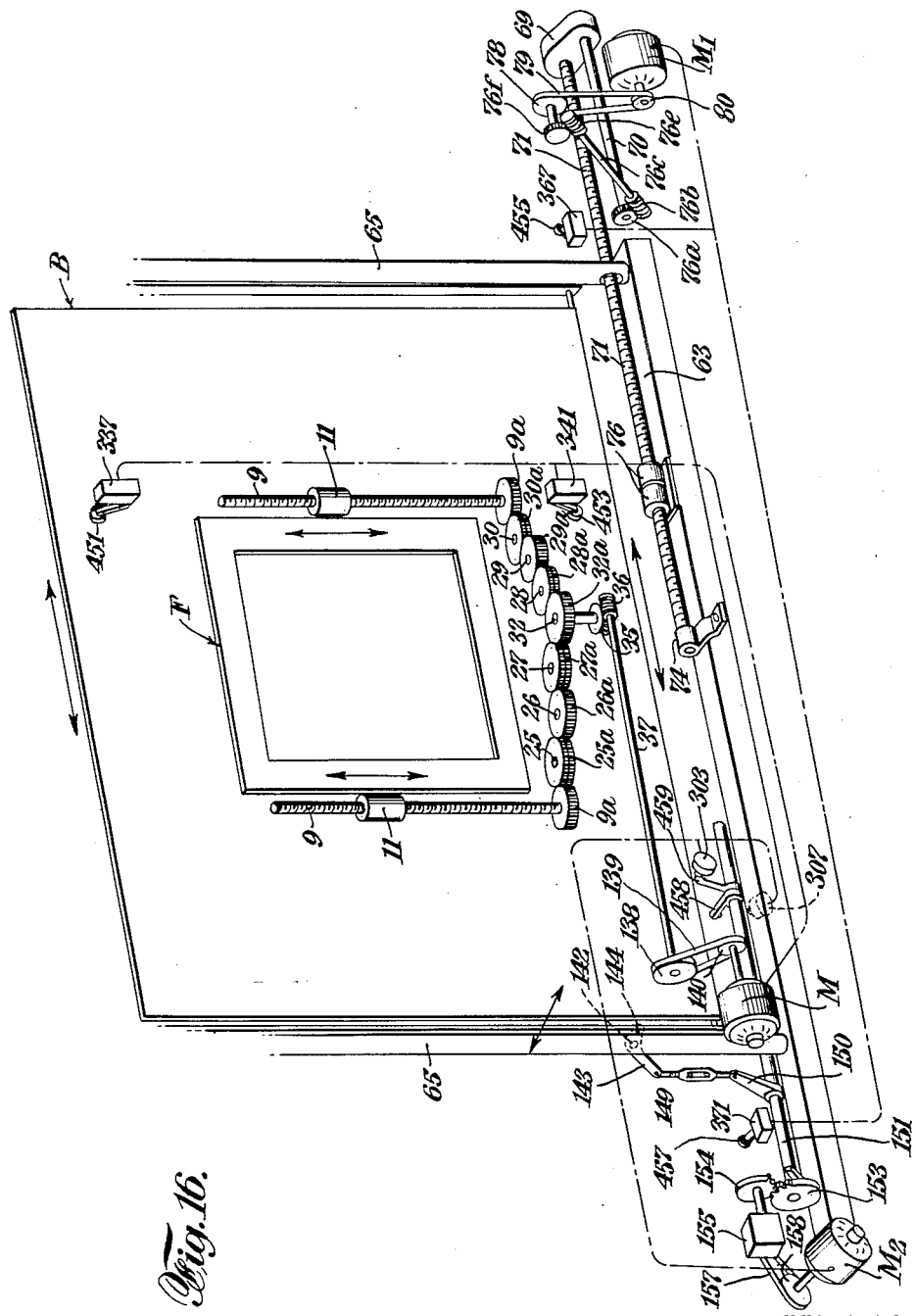

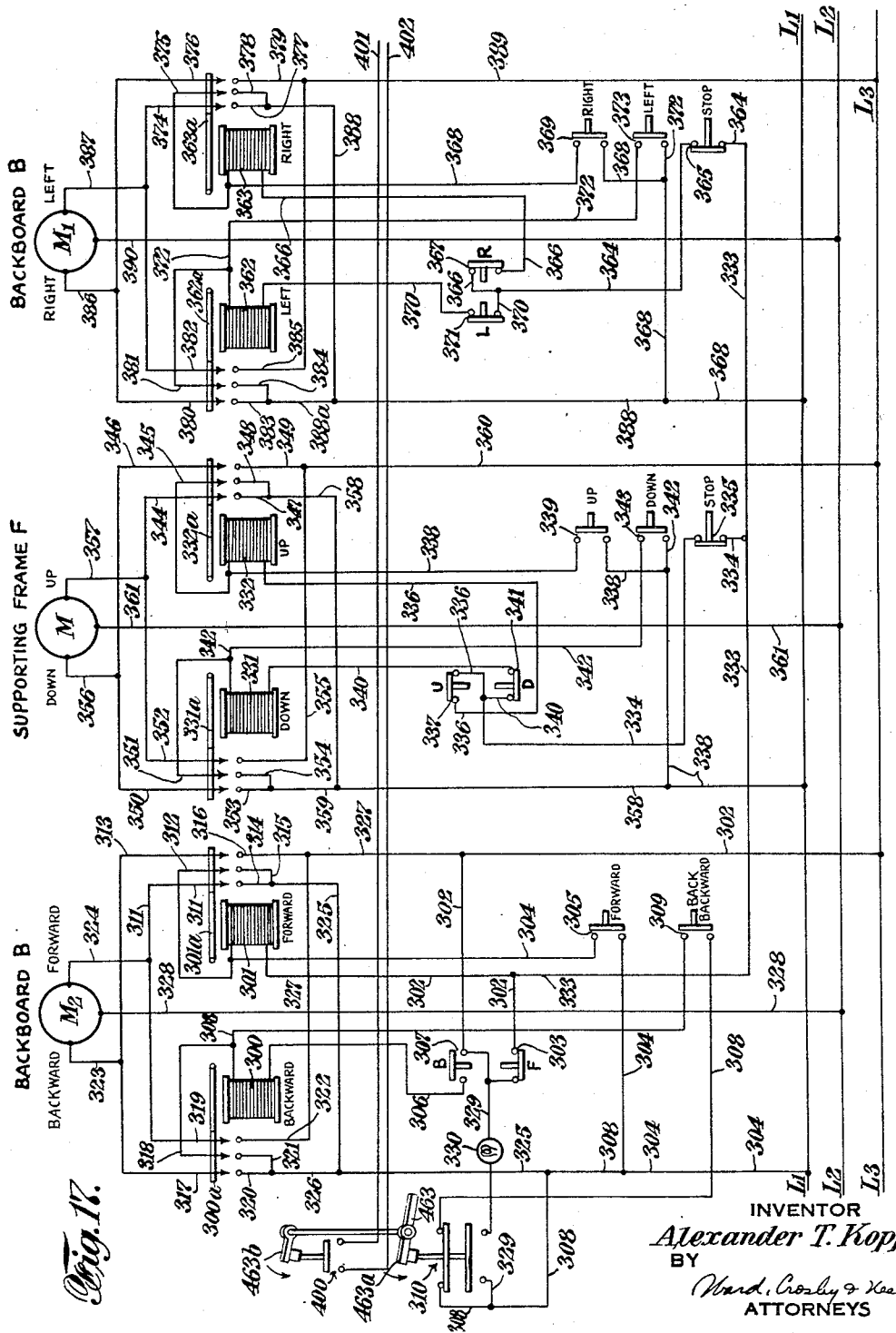

June 4, 1940.    A. T. KOPPE    2,203,094
CONTROL SYSTEM FOR PHOTOCOMPOSING MACHINES
Filed Aug. 22, 1936    11 Sheets-Sheet 11

INVENTOR
*Alexander T. Koppe*
BY
*Ward, Crosby & Neal*
ATTORNEYS

Patented June 4, 1940

2,203,094

UNITED STATES PATENT OFFICE 2,203,094

CONTROL SYSTEM FOR PHOTOCOMPOSING MACHINES

Alexander T. Koppe, Hasbrouck Heights, N. J., assignor to General Printing Ink Corporation, New York, N. Y., a corporation of Delaware Application August 22, 1936, Serial No. 97,432

14 Claims. (Cl. 95—76)

My invention relates to a control system for photocomposing machines.

My invention has particular reference to system for controlling movement, in a desired manner, of various operating parts of a photocomposing machine.

More particularly, my invention relates to a control system adapted, in part, to be rendered ineffective during those periods when the printing plate is held in printing relation with respect to the sensitized surface.

Various other objects, advantages and characteristics of my invention will become apparent from the following detailed description.

My invention resides in the photocomposing art, control system for a photocomposing machine, features, combinations and arrangements of the character hereinafter described and claimed.

My invention relates to a control system adapted to be utilized, for example, in connection with a photocomposing machine of the character disclosed in U. S. Letters Patent No. 2,174,726.

For an understanding of my invention and for an illustration of one of the many forms thereof, reference is to be had to the accompanying drawings, in which:

Figure 1 is an elevational view of my novel photocomposing machine as viewed from the front;

Fig. 2 is a transverse, vertical sectional view, partly in elevation and with parts omitted, taken substantially centrally of the machine shown in Fig. 1;

Fig. 3 is an enlarged, fragmentary view, partly in section, showing one of the switches as constructed in accordance with my invention;

Fig. 4 is a horizontal sectional view, partly in plan and with parts omitted, this view being taken centrally of the machine shown in Fig. 1;

Fig. 5 is an enlarged, fragmentary view, partly in section, showing the timer mechanism of my invention;

Fig. 6 is an enlarged, horizontal sectional view, partly in plan and with parts omitted, of the right side of the machine shown in Fig. 1;

Fig. 7 is an enlarged sectional view showing a plurality of the meshing pinions of Fig. 4;

Fig. 8 is a fragmentary plan view of a part of the arrangement shown in Fig. 7;

Fig. 9 is an enlarged, horizontal sectional view, partly in plan and with parts omitted, of the left side of the machine shown in Fig. 1;

Fig. 10 is an enlarged, fragmentary view, partly in section, showing the vacuum valve arrangement of my invention;

Fig. 11 is a side elevational view, taken substantially on the line 11—11 of Fig. 9;

Fig. 12 is a side elevational view corresponding with Fig. 11 but showing the parts in different positions, respectively;

Fig. 13 is an elevational view, with parts omitted, showing the rear of my novel photocomposing machines;

Fig. 14 is a perspective view showing the shifting mechanism for shifting the backboard toward and from printing position;

Fig. 15 is a perspective view corresponding with Fig. 14 but showing a different position of some of the parts;

Fig. 16 is a semi-diagrammatic, perspective view, with parts omitted, of the photocomposing machine of my invention;

Fig. 17 is a diagrammatic view principally showing the control circuits of the electrical motor system.

Figure 18:
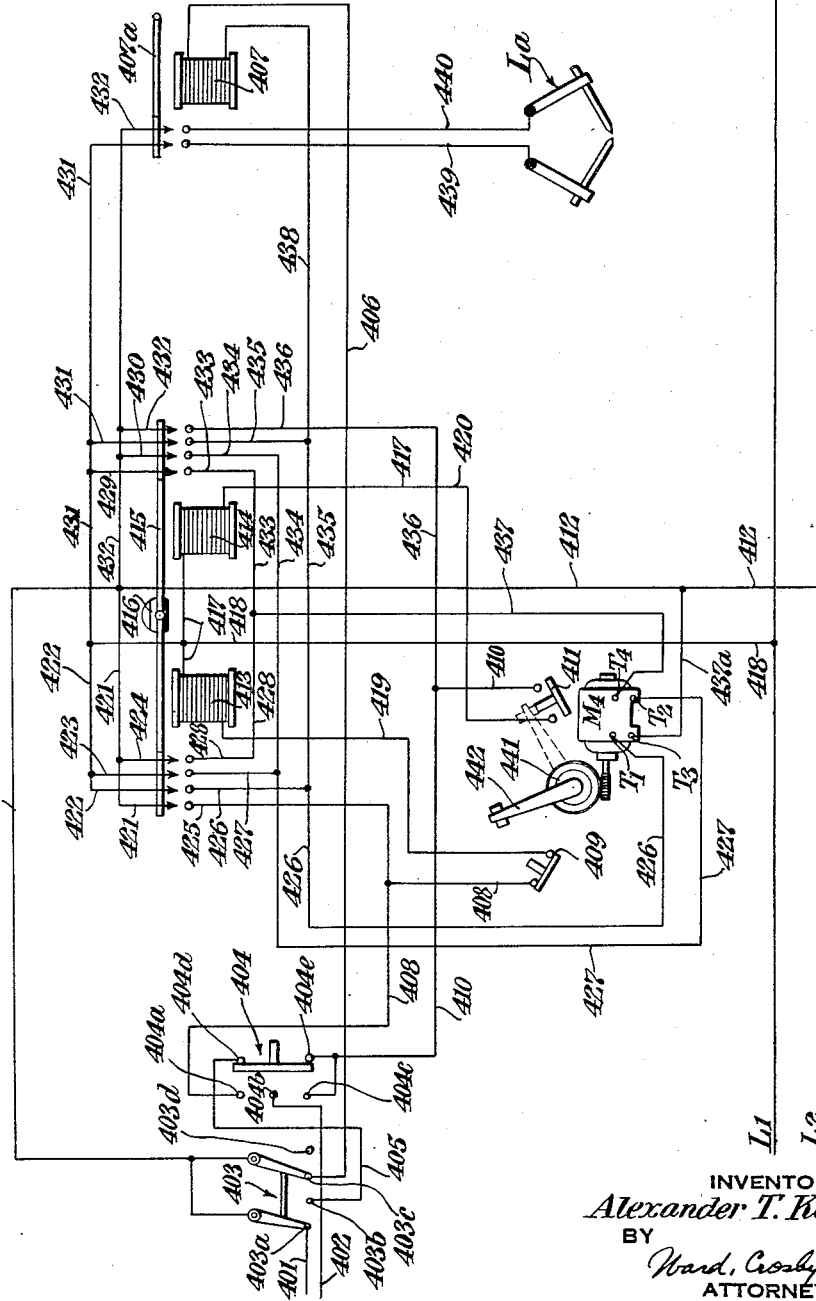
Fig. 18 is a diagrammatic view principally showing the control circuits of the timer system.

Inasmuch as the particular form of control system herein disclosed is adapted for use with a photocomposing machine of the character disclosed in U. S. Letters Patent No. 2,174,726, I have deemed it desirable to include as a part of this application a substantial part of the disclosure forming a part of U. S. Letters Patent No. 2,174,726.

Thus, referring to Fig. 1, there is shown a hollow base 1 which is adapted to occupy a fixed position on a floor or other suitable supporting surface. As illustrated, the base 1 comprises oppositely extending wing sections 1a, 1a, these being utilizable in the manner hereinafter described. Upstanding from said base 1 are a pair of standards 2, 2a, these standards being vertically disposed in parallel relation and suitably secured to the base 1, as by the bolts 3. Suitably fastened in fixed position to the top surfaces of the standards 2, 2a is a horizontal bar 4 formed from non-flexible metallic material. This bar 4 extends equal distances beyond each of the standards 2, 2a and each projecting section of said bar 4 has an angle member 5 suitably secured thereto. As clearly shown in Fig. 1, a vertical wing member 6 is suitably secured, as by screws or bolts, to each angle member 5, to the adjacent base wing section 1a which is disposed therebelow, and to the adjacent standard 2 or 2a as the case may be. It results, therefore, with an arrangement of the character described, that the wings 6 are vertically disposed in the same vertical plane and that they form fixed extensions of the base 1. Preferably although not necessarily, each of the wings 6 is formed from a sheet of wood which is covered by suitable sheet metal shaped to form smooth, flat inner and outer surfaces.

As shown in Figs. 1 and 2, each of the standards 2, 2a has a vertical track member 7 suitably secured thereto in fixed position, the top surfaces of said track members 7 being connected together by a transversely, horizontal member 8. The track members 7 are disposed in the same vertical plane, this plane being parallel with respect to the plane of the wings 6 and closely adjacent thereto.

Vertically disposed immediately adjacent each of the track members 7 is a jack screw 9, these jack screws being rotatably mounted in upper and lower bearings 9a formed in projecting sections of the respective standards 2, 2a.

Coactable with each of the jack screws 9 is a traveling nut 10, each nut 10 carrying a bracket arm 11, Fig. 2, the bracket arms 11 being secured in suitable manner to the respective slide members 12 which slidably engage the track members 7, respectively, Fig. 5, the hereinafter described frame F also coacting with said track members 7 in a guiding sense. As well understood in the art, the slide members 12 coact with their respective track members to prevent horizontal play while providing for the desired freedom of movement between coacting parts. Each of the slide members 12, then, is positioned adjacent one of the jack screws 9 and said slide members 12 are bolted or otherwise suitably secured to the opposite vertical sides, respectively, of a supporting frame F having a rectangular opening.

This supporting frame F is adapted to move either upwardly or downwardly in the space between the two track members 7. As shown in Figs. 1 and 2, upper and lower curtains 13 and 14 are connected to the respective upper and lower sides of the supporting frame F. The upper curtain 13 is wound upon a horizontal roller 15 supported by end brackets 16 carried by and depending from the bar 4, Fig. 2, these end brackets also supporting a horizontal idler roller 17 utilizable for guiding said upper curtain 13. As shown in Figs. 1 and 2, a cover member 18 is secured to the bar 4, this member being utilizable for partially enclosing the roller 15 and associated parts. The lower curtain 14 is wound upon a horizontal roller 19 supported by end brackets 20 suitably held in fixed position interiorly of the base 1. The end brackets 20 also support a horizontal idler roller 21 cooperative with the lower curtain 14 as shown in Fig. 2. Disposed above the roller 19 and suitably held in fixed position is a light shield 21a which extends transversely across the base 1 for the purpose of preventing the passage of light into engagement with the hereinafter described light-sensitive surface.

In order that the jack screws 9 may be rotated at exactly the same speed and in the same direction, I have provided, in accordance with the invention of said pending application, a combined motor-manual control arrangement of novel character as hereinafter described.

Thus, as shown in Figs. 1, 2 and 4, the front horizontal surface 1b of the base 1 carries bearings for and supports a plurality of spaced vertical stub shafts 25, 26, 27, 28, 29 and 30, these shafts depending into the hollow interior of the base 1 and having secured thereto the respective pinions 25a, 26a, 27a, 28a, 29a and 30a. Further, as shown, the lower end of each jack screw 9, interiorly of said base 1, has a pinion 9a secured thereto. All of the pinions just referred to are duplicates of each other and, as illustrated, the arrangement is such that the pinion 27a meshes with the pinion 26a, which meshes with the pinion 25a, the latter, in turn, meshing with the jack screw pinion 9a at the left, Fig. 4. Similarly, the pinion 28a meshes with the pinion 29a which meshes with the pinion 30a, the latter, in turn, meshing with the jack screw pinion 9a at the right, Fig. 4.

Referring to Fig. 2, the front vertical wall of the base 1 is shown as supporting a bracket 31 which carries a lower bearing 31a for a vertical shaft 32 having an upper bearing at the aforesaid surface 1b, the shaft 32 being spaced substantially equi-distantly from the above noted stub shafts 27 and 28. The shaft 32, interiorly of the hollow base 1 carries a pinion 32a which is a duplicate of the various pinions 26a, 27a, etc., said pinion 32a meshing with the aforesaid pinions 27a, 28a as shown in Fig. 4. The shaft 32 extends above the aforesaid horizontal surface 1b and carries a circular micrometer disk 33 cooperative with a fixed pointer member 34, Fig. 4.

The lower end of the shaft 32 carries a worm wheel 35, Fig. 4, with which meshes a worm 36 secured to a horizontal shaft 37 suitably supported in a bearing formed by the aforesaid bracket 31 and in other bearings as hereinafter described.

One end of this shaft 37 extends beyond the base 1 and carries a pulley 38 which is driven by an endless belt 39 driven, in turn, by a pulley 40 carried by the armature shaft of an electric motor M. The other end of said shaft 37 terminates interiorly of the hollow base 1 and carries a gear 41 which meshes with a gear 42 carried by a suitably supported shaft 43, Fig. 4. Disposed in a bearing formed in the horizontal surface 1b is a shaft which carries an operating hand wheel 44, this shaft last named being operatively connected to the aforesaid shaft 43 by an endless chain 45, or equivalent.

It is highly desirable, in accordance with the invention, that backlash and lost motion be largely or entirely eliminated from the gear trains between the pinion 32a and the respective pinions 9a of the jack screws 9. To this end, as shown, the pinions 25a, 27a, 28a and 30a may be constructed as illustrated in Figs. 7 and 8 in connection with the pinion 28a. That is, each of said pinions, at the periphery thereof, may be provided with a peripheral, circular recess 46 in which is received a gear ring 47 having elongated, arcuate slots 48 alined with the respective threaded passages 49 formed in said pinion 28a. Extending through each slot 48 and threaded into the adjacent passage 49 is a screw 50. As will be understood, the teeth of the gear ring 47 and those of the pinion 28a correspond with each other.

With the parts positioned as shown in Fig. 4, it will be understood that the four screws 50 may be loosened whereupon the gear ring 47 may be moved to slight extent on and circumferentially of the pinion 28a. By so doing, lost motion is eliminated between the pinions 29a, 32a and the connecting pinion 28a (including its gear ring 47). Then, by tightening said screws 50, the gear ring 47 is clamped in its adjusted position to the pinion 28a. The gear teeth of said pinion 28a and the gear ring 47, after adjustment of the latter has been effected, are related as shown by the full and broken lines in Fig. 8 and, because thus related, backlash and lost motion between the pinions 29a, 32a and the interconnecting pinion 28a are substantially entirely eliminated.

As will readily be understood, corresponding adjustments effected on the gear rings 47 of the respective pinions 25a, 27a and 30a results in the elimination of backlash and lost motion between the pinion 32a and the two jack screw pinions 9a. It results, therefore, that the position of the disk 33 necessarily reflects with extreme accuracy the position of and all adjustments which are imparted to the jack screws 9.

As shown in Fig. 2, the upper bearing for the aforesaid shaft 32 is constituted by a member 51 having elongated slots through which extend the respective bolts 52 securing said member 51 to the base surface 1b. In generally the same manner, the bolts 53 which secure the lower bearing 31a of the shaft 32 to the bracket 31 extend through elongated slots as shown. By virtue of this adjustable arrangement, it follows that the bolts 52 and 53 may be loosened so as to permit the shaft 32 and its pinion 32a to have a limited degree of movement. Accordingly, the pinion 32a may readily take such a position that it is in proper meshing relation with respect to the pinions 27a and 28a after they have been set as described above in order to avoid backlash.

After the pinion 32a has been positioned as described immediately above and then locked in position by tightening of the bolts 52 and 53, it may be that the worm 36 is not in proper meshing relation with the worm wheel 35—the latter necessarily moves with the shaft 32 and pinion 32a during the adjusting movements imparted to the pinion 32a. In order to care for this condition, if it should occur, I provide a compensating arrangement of the following character.

As shown in Fig. 4, the bearing 55 for one end of the shaft 37 is secured to the base 1 by bolts 56 which extend through elongated slots provided, respectively, therefor in said bearing 55. The other end of said shaft 37 is supported in a bearing arrangement 57 having a plurality of elongated slots through which extend the respective bolts 58 securing said bearing arrangement 57 to its supporting structure. Furthermore, as illustrated in Figs. 2 and 4, the bracket 31 is secured to the base 1 by bolts 59.

After the pinion 32a has been so adjusted as to be in proper meshing relation with the pinions 27a and 28a as described above, the various bolts 56, 58 and 59 may be loosened whereupon the shaft 37 may be moved from left to right, Fig. 2, to thereby cause the two gear wheels 36 and 35 to assume a proper meshing relation. At this time, a flat shim 31b may be placed between the base of the bracket 31 and the adjacent surface of the base 1 and, then, said bolts 56, 58 and 59 may be tightened to positively maintain the gear wheel 36 in the position to which adjusted.

As shown in Fig. 4, one of the stub shafts for the pinions 25a, 26a, etc., such, for example, as the shaft 25 may have connected thereto a gear 59a which meshes with and drives another gear 59b secured to a shaft 59c utilizable for operating suitable mechanism 59d for counting and indicating the revolutions imparted to the shaft 25.

The aforesaid base 1 and its wing sections 1a, 1a form a supporting structure to which a fixed track member 60 is secured in suitable manner, as by the bolts 61, Fig. 2. Supported by this track member 60, through the anti-friction rollers 62, is a carriage 63, Fig. 2, the length of which is somewhat less than that of the track member 60. Secured to and upstanding from each end of the carriage 63 is a bracket member 64, each of which supports a standard 65, the height of these standards being substantially the same as the combined height of the aforesaid base 1 and wing sections 6, and said standards 65, at the top thereof, being connected together by a horizontal member 66. These standards 65 and their horizontal connecting member 66 form a structure which extends vertically in spaced relation with respect to the adjacent wing sections 6. For guiding and steadying purposes, it is desirable that a plurality of horizontal members 67 be secured to the connecting member 66, these members 67 slidably gripping the above described bar 4 to which the wing sections 6 are secured.

In the form of the invention herein illustrated, the track member 60 extends to the right, when the machine is positioned as in Fig. 1, and the end of said track member at the right has an upstanding standard 68 secured thereto, this standard, as shown in Fig. 6, supporting a housing 69 forming end bearings for a drive shaft 70 and a screw shaft 71. Rotatable with these shafts 70 and 71 and disposed within the housing 69 are the respective gears 72 and 73 which are disposed in meshing relation, the gear 73 comprising a ring 73a corresponding with and operating the same as the ring gear 47 for removing backlash.

The screw shaft 71 extends from right to left, Fig. 6, horizontally above the carriage 63 and is disposed in a passage in that bracket 64 at the right of the machine, when viewed from the front, said passage being larger than the screw shaft 71, and free from threads. At its end remote from the housing 69, the screw shaft 71 has a rotatable bearing in a bracket 74 fixed to the upper surface of a section 1d of the base 1, Fig. 2. For purposes of accurate adjustment, it is desirable that the carriage 63 support another bracket 75, Fig. 6, which supports a pair of internally threaded nut devices 76 through which the screw shaft 71 extends and to which said shaft is threaded, these nut devices 76, as well understood in the photocomposing machine art, coacting with said screw shaft to prevent "whip" and backlash.

The drive shaft 70 extends from right to left, Fig. 6, and has bearing engagement with surfaces of the adjacent base wing section 1a. Said shaft 70, at its end remote from the housing 69, terminates in a spiral gear 76a which meshes with a spiral gear 76b carried by one end of a shaft 76c mounted in bearings formed in a bracket secured to the interior surface of said last named wing section 1a. The other end of the shaft 76c carries a spiral gear 76e which meshes with a spiral gear 76f secured at one end of a stub shaft 77 mounted in a bearing in the aforesaid wing section 1a. By the use of take-up means 76h, Fig. 6, coactable with their engaging spiral gears 76a and 76f, backlash is removed from the gear connection between the shafts 77 and 70.

As indicated in Figs. 1 and 6 and as more fully disclosed in U. S. Letters Patent No. 2,174,726, the stub shaft 77 has secured thereto a pulley 78 with which coacts an endless belt 79 disposed in driving relation on a second pulley 80 secured to the armature shaft of an electric motor M1 suitably secured to said wing section 1a.

The pulley and belt mechanism just described is disposed interiorly of a fixed housing 81 which supports suitable counter mechanism 87 geared to the stub shaft 77. As shown in Fig. 1, a housing 89 is disposed at the free end of said stub shaft 77, this housing supporting a shaft which carries a hand wheel 94, said last named shaft being suitably connected by pulley and belt mechanism to the stub shaft 77 which, as shown, also carries a micrometer wheel 95.

In the form of the invention herein shown, a pivoted backboard B is utilized for the reception of the press plate, sensitized member or light-sensitive surface or member 240. This backboard B is positioned between the standards 65, 65 and, as hereinafter described, is adapted to occupy either a vertical or horizontal position.

As herein illustrated, the backboard B comprises a rectangular frame formed from vertical side members 100, 100 and the horizontal top and bottom members 101, 101, said frame being braced in any suitable manner. As shown, the free end of the backboard B may carry supporting legs 105 each of which may terminate in a roller 106, Fig. 2. Further, the rear surface of the backboard B preferably carries a handle member utilizable for lowering and raising said backboard. Still further, as described in U. S. Letters Patent No. 2,174,726, said rear surface of the backboard B carries a pivoted lever having an actuating handle. Pivoted to opposite ends of this lever are links which terminate, respectively, in rods 111 guided for horizontal movement by a bracket 112, Figs. 14 and 15.

Suitably secured to the rear surface of the backboard B and at the respective opposite sides thereof are the brackets 113, Figs. 14 and 15, which extend at right angles to the operative surface of said backboard B and each of which terminates in a lateral section 113a, each lateral section 113, if desired, having a bolt, not shown, adjustably threaded therethrough. Each bracket 113 is formed with a transverse passage, these passages being alined with the respective passages of the aforesaid brackets 112. It follows, therefore, that each rod 111 is readily slidable in the passage through its associated brackets 112 and the passage 113b in the adjacent bracket 112.

As shown in Fig. 2, the aforesaid frame of the backboard B has a supporting structure 116 secured thereto in suitable manner, this supporting structure being formed from fibre or other suitable material and supporting an outer surface 117 formed from hard rubber, or equivalent, to which the light-sensitive member is suitably secured.

Secured in horizontal alinement to the bottom frame member 101 of the backboard B are a plurality of brackets 118. As shown in Fig. 13, the two brackets at the left of the backboard B support a horizontally disposed axle member 119, the two brackets at the right of said backboard B support a horizontal axle member 120, and the three brackets centrally of said backboard support a horizontal axle member 121.

As clearly appears, the outer respective ends of the axle members 119 and 120 are received in passages formed, respectively, in vertically disposed members 122, the outer end of each axle member 119 and 120 preferably having a locking nut threaded thereto. For purposes of ready alinement, it is desirable that the aforesaid passages in the members 122 be formed substantially larger than the ends of the axle members 119, 120 and that blocks 124 be suitably secured to the respective lower ends of said members 122, each of these blocks having a passage which snugly receives the end of the adjacent axle member 119 or 120 and said blocks being adjustable on the lower ends of said members 122 so that the respective passages thereof may accurately be alined with the axle members 119, 120, respectively.

As shown in Figs. 4 and 9, the carriage 63 supports an upwardly-extending bracket 125 having a flat upper surface upon which rests a collar 126 secured to the aforesaid axle member 121. Accordingly, as will be understood, the bracket 125 serves as a support for the backboard B through the instrumentality of the axle member 121 and associated parts.

As illustrated in Figs. 2 and 13, the axle member 119 supports a spiral spring 127, one end 127a of which engages the rear surface of the backboard B and the other end 127b of which is secured to a lug 128 having a slotted outer end in which is secured the upper end of a lever 129 pivoted at 130 to a bracket 131 supported by the carriage 63.

As herein disclosed, the axle member 120 supports a similar spiral spring arrangement and the axle member 121 supports a pair of said spiral spring arrangements.

When the backboard B is in its vertical position, the aforesaid spiral springs 127 are unwound or substantially so. However, when said backboard is manually lowered toward and to its horizontal position, these springs 127 are automatically wound or energized. Therefore, as will readily be understood, said springs 127 serve to counterbalance and cushion movement of said backboard B.

As hereinafter described, the backboard B is adapted to be moved either toward or from the hereinbefore described supporting frame F. To this end, each of the standards 65 supports an adjusting mechanism utilizable for moving the backboard B to and fro as just stated.

In accordance with this phase of the invention, the standard 65 at the left of the machine as viewed when facing the front thereof has fixed thereto an upper block 132 and a corresponding lower block, these blocks supporting a fixed member 134, Figs. 14 and 15. Suitably secured, as by bolts, to the fixed member 134 are the upper and lower key members 136 each being cut away as indicated at 136a and the cut-away sections being disposed in vertical alinement so as to receive the aforesaid vertical member 122 which is adapted to be moved, while held vertical, toward or from the aforesaid supporting frame F. Slidable horizontally on each key 136 is a block 138, these blocks being secured to said member 122 by suitable bolts. Above the upper block 138, the vertical member 122 has a member 139 secured thereto by suitable bolts, this member 139 carrying a lateral socket member adapted, when the backboard B is in vertical position, to be in alinement with the path of movement of the aforesaid rod 111.

Pivoted at 142 to the fixed member 134, adjacent the lower end thereof, is a lever 143 having its outer end connected by a pivot pin 144 to a strap member 145, one end of the pivot pin 144 being operatively related to an elongated slot 122a formed in the lower end of the aforesaid vertical member 122. The strap member 145 extends in a vertical direction and is disposed flatwise against the vertical member 122. At its upper end, said strap member 145 carries a pivot pin 146 on which a lever 147 is loosely supported, the latter being pivoted to the fixed member 134 by a pivot pin 148, and the pin 146 being operatively related to an elongated slot 122b formed in the upper end of the vertical member 122.

As shown in Fig. 2, there is connected to the lever 143 an adjustable link arrangement 149 adapted to partake of pivotal movement, this link arrangement being connected to an arm 150 oscillatable with a horizontal shaft 151 mounted in bearings 152 supported by the aforesaid carriage 63.

As stated above, each of the standards 65 supports an adjusting mechanism for shifting the backboard B in the manner described. Inasmuch as the adjusting mechanism for the other standard 65 is a duplicate of the one just described, this description will not be repeated and, on the drawings, duplicate reference characters will be used for the designation of corresponding parts.

Accordingly, in view of the description given above, it will be understood that the shaft 151 carries two arms 150 which, through the described mechanisms, impart to and fro movement to the backboard B. For imparting rotatable movement to this shaft 151, there may be utilized an arrangement of the character shown in Figs. 9, 11 and 12 wherein the shaft 151 is shown as carrying a disk 153 which cooperates with a second disk 154 of generally similar configuration, the disk 154 being mounted on a shaft which extends from a box 155 containing suitable gear reduction mechanism, power to which is delivered by a shaft 155a carrying a pulley 156 engaged by an endless belt 157 driven by a second pulley 158 mounted on the armature shaft of a suitable electrical motor M2 mounted in suitable manner on an extension of the carriage 63.

As illustrated in Figs. 11 and 12, the disks 153, 154 are provided, respectively, with gear segments 153a, 154a whereby power is transmitted from the disk 154 to the disk 153.

It is desirable that suitable shock-absorbing mechanism be provided for cushioning the impact transmitted from the disk 154 to the disk 153 when power is applied to said disk 154. A preferred form of such shock-absorbing mechanism is shown in Figs. 11 and 12.

Thus, on supports 159, 160 extending laterally from the disk 153 are mounted the respective levers 161, 162 which are engaged, respectively, by springs 163, 164, each spring seating against a member 165 fixed to the disk 153 and each spring normally holding its associated lever in engagement with a stop 166. These springs are relatively "heavy" so that each of them absorbs a large amount of the instantaneous power of the motor M2 at the instant that a driving connection is established between the disks 154 and 153. The disk 154 is mounted on a shaft 167 which extends from the aforesaid gear box 155. Secured to an extension of this shaft is a collar 168 having an actuating lug 169 carried thereby and projecting therefrom.

With the various parts positioned as shown in Fig. 11, the backboard B is in its advanced position toward the printing plate. If it becomes desirable to move said backboard toward the rear of the machine, the motor M2 is energized in the manner hereinafter described to cause the disk 154 and its actuating lug 169 to move in a clockwise direction, Fig. 11, from the full line representation of the parts.

As the two disks 153 and 154 are positioned in Fig. 11, a curved sector 153b of the disk 153 is disposed concentrically with respect to the shaft 167 and closely adjacent the periphery of the disk 154. Therefore, as the disk 154 starts to move in a clockwise direction from the full line position thereof shown in Fig. 11, the disk 153 necessarily remains stationary.

Eventually, as the disk 154 moves in the direction last described, the inclined surface 169a of the actuating lug 169 comes into engagement with the curved surface 161a of the lever 161 and moves said lever 161 slightly, as a distance of .010 of an inch more or less, in a counterclockwise direction, Fig. 11, with resultant compression of the spring 163 and absorption of shock. After said lever 161 has moved approximately the distance just described, the gear tooth 154b of the disk 154 comes into engagement with the gear tooth 153c of the disk 153. Thereupon, the teeth of the gear segment 154a positively engage the teeth of the gear segment 153c to move the disk 153 in a counter-clockwise direction, Fig. 11.

At each end of the gear segment 154a, the material of the disk 154 is cut away to form the clearance passages 154c and 154d, the length of these passages being approximately one-half the length of the curved sector 153b of the disk 153. Therefore, with the disk 154 positioned as shown by the broken lines of Fig. 11—when movement of the disk 153 in a counter-clockwise direction, Fig. 11, is just being initiated—there is clearance space in the disk 154 for the material defining the rear surface of the sector 153b of the disk 154.

Movement of the disk 153 in a counter-clockwise direction, Fig. 11, under the control of the disk 154, continues until the two gear segments 153a, 154a are disengaged. At this time, a limit switch as hereinafter described opens the circuit of the motor M2 and, also at this time, the disk 153 becomes stationary by reason of the fact that the curved sector 153d thereof assumes a position wherein it is concentric with respect to the shaft 167 and closely adjacent the periphery of the disk 154. Further, when the disk 153 becomes stationary as just described, the backboard B is in its retracted position removed from the printing plate. Immediately after the circuit of the motor M2 is opened as just described, the disk 154 coasts approximately to the position shown by the broken lines in Fig. 12.

When the backboard B is to be moved toward the front of the machine, an operation is performed which is the reverse of that described above. That is, the motor M2 is energized in the manner hereinafter described to cause the disk 154 and its actuating lug 169 to move in a counter-clockwise direction, Fig. 12, from the broken line representation of the parts.

As the two disks 153 and 154 are positioned in Fig. 12, the curved sector 153d of the disk 153 is positioned as shown and as described above. Therefore, as the disk 154 starts to move in a counter-clockwise direction from the broken line position thereof shown in Fig. 12, the disk 153 necessarily remains stationary.

As the disk 154 continues to move in a counter-clockwise direction as last noted, the inclined surface 169b of the actuating lug 169 comes into engagement with the curved surface 162a of the lever 162 and moves said lever 162 to slight extent in a clockwise direction, Fig. 12, with resultant compression of the spring 164 and absorption of shock. After said lever 162 has been moved slightly as just stated, the gear tooth 154e of the disk 154 comes into engagement with the gear tooth 153e of the disk 153. Thereupon, the teeth of the gear segment 154a positively engage the teeth of the gear segment 153a to move the disk 153 in a clockwise direction, Fig. 12. During initial movement of said disk 153, the clearance space 154c serves to prevent binding between the rear surface of the sector 153d and the adjacent face of the disk 154.

Movement of the disk 153 in a clockwise direction, Fig. 12, under the control of the disk 154 continues until the two gear segments 153a, 154a, are disengaged. At this time, a limit switch as hereinafter described opens the circuit of the motor M2 and, also at this time, the disk 153 becomes stationary due to the fact that the curved section 153b thereof has again assumed a position wherein it is concentric with respect to the shaft 167 and closely adjacent the periphery of the disk 154. When the disk 153 becomes stationary as just stated, the backboard B is in its advanced position toward the printing plate and, immediately after the circuit of the motor M2 is opened as just described, the disk 154 coasts to the approximate position shown by the full lines in Fig. 11.

The supporting frame F previously referred to is adapted to support an adapter frame A which, in turn, is adapted to support a printing plate holder P, the latter serving as a support for the printing plate P1 which may be either a photographic positive or negative as desired, the likeness of which is to be reproduced on the sensitized surface supported by the backboard of the photocomposing machine. As shown in Fig. 1, a sealing frame f may be utilized for sealing the opening between the printing plate P1 and the printing plate holder P. Alternatively, said printing plate holder may be of such dimensions that it is supported directly by the supporting frame F without requiring the use of an adapter frame A. All of the construction noted immediately above is described in detail in U. S. Letters Patent No. 2,174,726.

In accordance with my invention, the circuits of the hereinbefore described motors M, M1 and M2 together with the circuit of the hereinafter described printing lamp La are controlled in a novel and highly desirable manner. The electrical current supply for these various circuits may be direct or alternating, or single or multiphase as desired. As herein shown, three-phase alternating current is thus utilized, the supply thereof being obtained from the line circuit designated by the conductors L1, L2 and L3, Fig. 17.

Utilizable for controlling the motor M2, as the latter is shown in Fig. 17, are the coils 300, 301, or equivalent.

From the line L3, a conductor 302 leads to one terminal of the coil 301, this conductor 302 including the fixed contacts of a closed limit switch 303. The other terminal of the coil 301 has connected thereto a conductor 304 which leads to the line L1, this conductor 304 including the fixed contacts of a normally open, manually operable switch 305.

Connected to the aforesaid conductor 302 (which leads to the line L3) is a conductor 306 which leads to one terminal of the coil 300, this conductor 306 including the fixed contacts of an open limit switch 307. The other terminal of the coil 300 has connected thereto a conductor 308 which leads to the line L1 by way of a part of the conductor 304, this conductor 308 including the fixed contacts of a manually operable, normally open switch 309 and this conductor 308 also including the upper set of fixed contacts of a switch 310.

Coactable with the coil 301 is an armature 301a utilizable for moving the movable contacts of the respective conductors 311, 312 and 313 into engagement with the respective fixed contacts of the conductors 314, 315 and 316.

Coactable with the coil 300 is an armature 300a utilizable for moving the movable contacts of the respective conductors 317, 318 and 319 into engagement with the respective fixed contacts of the conductors 320, 321 and 322.

As illustrated, the conductors 313 and 317 are connected together at and to a branching conductor 323 which leads to one terminal of the motor M2. The conductor 312 is connected to the aforesaid conductor 304. The conductors 311 and 319 are connected together at and to a branching conductor 324 which leads to another terminal of the aforesaid motor M2. The conductors 314 and 315 are connected together to a common conductor 325 which leads to and is connected to the aforesaid conductor 308. The conductors 320 and 321 are connected together to a common conductor 326 which leads to and is connected to said conductor 325. The condutors 316 and 322 are connected together to a common conductor 327 which leads to and is connected to the aforesaid conductor 302. The third terminal of the motor M2 has connected thereto a conductor 328 which leads to and is connected to the line L2.

Connected to the aforesaid conductor 308 between the switch 310 and the conductor 304 is a conductor 329 which leads to and is connected to the conductor 302 between the limit switch 303 and the line L3. This conductor 329 includes the lower set of fixed contacts of the switch 310 and it also includes an incandescent lamp 330.

In generally the same manner as described above in connection with the motor M2, coils 331, 332, or equivalent, are associated with the motor M, Fig. 17.

The aforesaid conductor 302 (which is connected to the line L3) has connected thereto, between the limit switch 303 and the coil 301, a conductor 333 which, in the manner hereinafter described, is adapted to connect said line L3 to the respective coils of the motors M and M1.

To this end, a conductor 334 is connected to said conductor 333, and this conductor 334 includes the fixed contacts of a normally closed switch 335. Connected to that end of the conductor 334 remote from the conductor 333 is a conductor 336 which leads to and is connected to one terminal of the coil 332, this conductor 336 including the fixed contacts of a normally closed limit switch 337. Connected to the other terminal of the coil 332 is a conductor 338 which leads to the line L1, this conductor 338 including the fixed contacts of a normally open, manually operable switch 339.

A second conductor 340 connected to that end of the conductor 334 remote from the conductor 333 leads to and is connected to one terminal of the coil 331, this conductor 340 including the fixed contacts of a normally closed limit switch 341. Connected to the other terminal of the coil 331 is a conductor 342 which leads to and is connected to the aforesaid conductor 338 between the switch 339 and the line L2, this conductor 342 including the fixed contacts of a normally-open, manually operable switch 343.

Coactable with the coil 332 is an armature 332a utilizable for moving the movable contacts of the respective conductors 344, 345 and 346 into engagement with the respective fixed contacts of the conductors 347, 348 and 349.

Coactable with the coil 331 is an armature 331a utilizable for moving the movable contacts of the respective conductors 350, 351 and 352 into engagement with the respective fixed contacts of the conductors 353, 354 and 355.

As illustrated in Fig. 17, the conductors 346 and 350 are connected together at a branching conductor 356 which leads to one terminal of the motor M. The conductor 345 is connected to the aforesaid conductor 338 which leads to one terminal of the coil 332. The conductors 344 and 352 are connected together at a branching conductor 357 which leads to another terminal of said motor M2. The conductors 347 and 348 are connected together to a common conductor 358 which leads to and is connected to the aforesaid conductor 338. Conductors 353 and 354 are connected together to a common conductor 359 which leads to and is connected to said conductor 358. The conductors 349 and 355 are connected together to a common conductor 360 which leads to and is connected to the line L3. The third terminal of the motor M has connected thereto a conductor 361 which leads to and is connected to the line L2.

Associated with the motor M1, Fig. 17, in generally the same manner as described in connection with the motors M2 and M are the coils 362, 363, or equivalent.

A conductor 364 is connected to the aforesaid conductor 333, this conductor 364 including the fixed contacts of a normally closed switch 365. Connected to that end of the conductor 364 remote from the conductor 333 is a conductor 366 which leads to and is connected to one terminal of the coil 363, this conductor 366 including the fixed contacts of a normally closed limit switch 367. Connected to the other terminal of the coil 363 is a conductor 368 which leads to the line L1, this conductor 368 including the fixed contacts of a normally open, manually operable switch 369.

A second conductor 370 is connected to that end of the conductor 364 remote from the conductor 333, the conductor 370 leading to and being connected to one terminal of the coil 362, the conductor 370 including the fixed contacts of a normally closed limit switch 371. Connected to the other terminal of the coil 362 is a conductor 372 which leads to and is connected to the aforesaid conductor 368 between the switch 369 and the line L1, the conductor 372 including the fixed contacts of a normally open manually operable switch 373. Coactable with the coil 363 is an armature 363a utilizable for moving the movable contacts of the respective conductors 374, 375 and 376 into engagement with the respective fixed contacts of the conductors 377, 378 and 379.

Coactable with the coil 362 is an armature 362a utilizable for moving the movable contacts of the respective conductors 380, 381 and 382 into engagement with the respective fixed contacts of the conductors 383, 384 and 385.

As shown, the conductors 376 and 380 are connected together at a branching conductor 386 which leads to one terminal of the motor M1. The conductor 375 is connected to the aforesaid conductor 368 which was described as leading to one terminal of the coil 363. The conductors 374 and 382 are connected together at a branching conductor 387 which leads to another terminal of said motor M1. The conductors 377 and 378 are connected together to a common conductor 388 which leads to and is connected to the aforesaid conductor 368 between the line L2 and the connection thereto of the conductor 372. The conductors 383 and 384 are connected together to a common conductor 388a which leads to and is connected to said conductor 388. The conductors 379 and 385 are connected together to a common conductor 389 which leads to and is connected to the line L3. The third terminal of the motor M1 has connected thereto a conductor 390 which leads to and is connected to the line L2.

Referring to Fig. 17, the fixed contacts of a switch 400 have conductors 401, 402 connected, respectively, thereto. As shown in Fig. 18, the conductor 401 is connected to a contact 403a of a switch 403, and the conductor 402 is connected to a contact 404b of a switch 404. (For purposes of ready understanding, the sheet of drawing on which Fig. 18 appears should be placed at the right of and in alinement with the sheet of drawing on which Fig. 17 appears.)

The switch 403 comprises three other contacts 403b, 403c and 403d. The contact 403b is connected to the contact 404d of the switch 404 by a conductor 405. The contact 403c is connected by a conductor 406 to one terminal of a coil 407, or equivalent. The contact 403d is a dummy contact.

The switch 404 comprises five contacts 404a, 404b, 404c, 404d and 404e, the contacts 404b and 404d being connected as noted above. The contact 404a of this switch is connected by a conductor 408 to one terminal of a limit switch 409. The contacts 404c and 404e are connected to a common conductor 410 which leads to one terminal of a second limit switch 411.

The switch 403 comprises two arms which are connected together so as to be movable only as a unit, these two arms being connected to a common conductor 412 which leads to the line L2. As clearly appears, the contacts of the switch 403 are engageable by the arms of said switch only in pairs 403a, 403c or 403b, 403d.

In addition to the coil 407, the circuit-controlling arrangement of Fig. 18 comprises a pair of coils 413, 414, or equivalent, coactable with an armature arrangement 415 pivoted at 416. One terminal of each of these coils 413, 414 is connected together to a common conductor 417 which is connected to a conductor 418 leading to the line L1. The other terminal of the coil 413 is connected by a conductor 419 to a terminal of the aforesaid limit switch 409. The other terminal of the coil 414 is connected by a conductor 420 to a terminal of the aforesaid limit switch 411.

The armature arrangement 415 of the coil 413 is utilizable for moving the movable contacts of the respective conductors 421, 422, 423 and 424 into engagement with the respective fixed contacts of the conductors 425, 426, 427 and 428.

The armature arrangement 415 of the coil 414 is utilizable for moving the movable contacts of the respective conductors 429, 430, 431 and 432 into engagement with the respective fixed contacts of the conductors 433, 434, 435 and 436.

As shown in Fig. 18, the conductor 421 has the conductor 424 connected thereto, said conductor 421 being connected to the aforesaid conductor 412 which leads to the line L2. The conductor 422 has the conductor 423 connected thereto, and said conductor 422 is connected to the aforesaid conductor 418 which, as stated, leads to the line Ll.

The conductor 425 leads to and is connected to the conductor 408. The conductor 426 leads to the terminal T1 of a timer motor M4. The conductor 427 leads to the terminal T2 of said motor M4. The conductor 428 leads to a conductor 437 which is connected to the terminal T4 of said motor M4. The terminal T3 of said motor M4 is connected to the aforesaid conductor 412 by a conductor 437a.

The conductor 432 has the conductor 430 connected thereto, said conductor 432 leading to and being connected to the aforesaid conductor 412 which leads to the line L2. The conductor 431 has the conductor 429 connected thereto, said conductor 431 leading to and being connected to the conductor 418 which leads to the line Ll.

The conductor 436 leads to and is connected to the aforesaid conductor 410. The conductor 435 leads to and is connected to the conductor 426. The conductor 434 leads to and is connected to the conductor 427. The conductor 433 leads to and is connected to the aforesaid conductor 437.

As hereinbefore stated, one terminal of the coil 407 is connected to the contact 403c of the switch 403 by a conductor 406. The other terminal of this coil 407 is connected to the conductor 435 by a conductor 438. The coil 407 has coactable therewith an armature 407a utilizable for moving the movable contacts of the aforesaid conductors 431, 432 into engagement with the respective fixed contacts of conductors 439, 440 which lead to and are connected to the electrodes of the lamp Lz, this lamp being of the arc type familiar to those skilled in the art for effecting the printing operations in connection with photocomposing machines.

The motor M4 is the familiar type of timer motor utilizable for operating mechanism for timing the duration of the periods of exposure, i. e., the periods during which the sensitized surface is illuminated by the printing lamp. A motor of this type includes a field winding between the contacts T1 and T3, and another field winding between the contacts T4 and T2. As shown, the armature of the motor M4 is geared to a wheel 441 which carries an arm 442 adapted to engage either the limit switch 409 or the limit switch 411. As will be hereinafter described, the limit switch 409 is stationary whereas the position of the limit switch 411 is adjustable so as to vary the duration of the timing periods.

The operation is as follows:

Preliminarily, as described in detail in U. S. Letters Patent No. 2,174,726, the operator secures to the supporting frame F either an adapter frame A and an associated printing plate holder P, or a printing plate holder P alone. Then, after a suitable sensitized surface has been secured to the backboard B, the latter is elevated by manual action to its vertical position whereupon the rods 111 are actuated to positively secure the upper end of said backboard B to the respective vertical members 122, the lower end of said backboard B already being positively retained to said vertical members 122 by the respective axle members 119 and 120. Upon completion of the foregoing, the backboard B is in its rear vertical position with the sensitized surface thereof facing the adjacent vertically disposed printing plate and spaced therefrom.

At this time, it becomes necessary to adjust the supporting frame F as regards the elevation thereof so as to cause the printing plate Pl to take the position which it is to occupy during the first printing operation. To this end, in order to raise said supporting frame F, the switch 339, Figs. 1 and 17, is closed to thereby complete through the coil 332 a circuit which leads from the line Ll, conductor 338 including the contacts of said switch 339, the coil 332, conductor 336 including the contacts of the normally closed limit switch 337, conductor 334 including the contacts of the normally closed switch 335, conductor 333, and thence to the line L3 by way of the conductor 302 which includes the contacts of the closed limit switch 303. When the coil 332 is thus energized, it attracts its armature 332a and closes the movable contacts of the conductors 344, 345 and 346 onto the respective fixed contacts of the conductors 347, 348 and 349.

In so doing, there is established a locking circuit for holding the coil 332 energized after the switch 339 automatically opens after release thereof by the operator. This locking circuit extends from the line Ll by way of the conductor 338, conductor 356, conductor 348, conductor 345, the winding of the coil 332, conductor 336 including the contacts of the normally closed limit switch 337, conductor 334 including the contacts of the normally closed switch 335, conductor 333, and thence to the line L3 by way of the conductor 302 which includes the contacts of the closed limit switch 303.

As stated, one terminal of the motor M is permanently closed to the line L2 by the conductor 361. The above noted closure of the armature 332a causes the conductors 356, 346 to be closed to the line L3 by way of the conductors 349 and 360. At the same time, the conductors 357, 344 are closed to the line Ll by way of the conductors 347, 358 and 338.

Accordingly, in response to closure of its operating circuit as just described, the armature of the motor M rotates in the proper direction to cause upward movement of the printing frame F under the direct control of the jack screws 9. When the frame F has been elevated approximately to its intended position, the stop switch 335, Figs. 1 and 17 is operated to open the above described holding circuit for the coil 332. In response to opening of this circuit, said coil 332 is deenergized with consequent release of its armature 332a whereby the operating circuit of the motor M is opened. In this way, operation of said motor M is discontinued and, at this time, by manipulation of the hand wheel 44, the desired elevated position of the supporting frame F may be attained with precision and nicety.

If it had been necessary to lower the supporting frame F rather than to raise the same, the switch 343, Figs. 1 and 17, is closed to thereby complete through the coil 331 a circuit which leads from the line Ll, by way of conductor 330, conductor 342 including the contacts of said switch 343, the coil 331, conductor 340 including the contacts of the normally closed limit switch 341, conductor 334 including the contacts of the normally closed switch 335, conductor 333, and thence to the line L3 by way of the conductor 302 which includes the contacts of the closed limit switch 303. When the coil 331 is thus energized, it attracts its armature 331a and closes the movable contacts of the conductors 350, 351 and 352 onto the respective fixed contacts of the conductors 353, 354 and 355.

In so doing, there is established a locking circuit for holding the coil 331 energized after the switch 343 opens when manually released. This locking circuit extends from the line L1 by way of the conductor 338, conductor 358, conductor 359, conductor 354, conductor 351, the winding of the coil 331, conductor 340 including the contacts of the normally closed limit switch 341, conductor 334 including the contacts of the normally closed switch 335, conductor 333, and thence to the line L3 by way of the conductor 302 which includes the contacts of the closed limit switch 303.

As stated, one terminal of the motor M is permanently closed to the line L2 by the conductor 331. The above noted closure of the armature 331a causes the conductors 356, 350 to be closed to the line L1 by way of the conductors 353, 359, 358 and 338. At the same time, the conductors 357, 352, are closed to the line L3 by way of the conductors 355 and 360.

Accordingly, in response to closure of its operating circuit, the armature of the motor M rotates in the proper direction, the opposite of that described above, to cause downward movement of the printing frame F under the direct control of the jack screws 8. When the frame F has been lowered approximately to its intended position, the stop switch 335, Figs. 1 and 17, is operated to open the above described holding circuit for the coil 331. In response to opening of this circuit, said coil 331 is deenergized with consequent release of its armature 331a whereby the operating circuit of the motor M is opened. Thus, operation of said motor M is discontinued and, at this time, by manipulation of the hand wheel 44, the desired lowered position of the supporting frame F may readily be attained.

The limit switches 337 and 341, Figs. 1, 16 and 17, are provided so that excessive upward or downward movements of the supporting frame F may be avoided. Thus, if the operator neglects to open the stop switch 335 while the supporting frame F is traveling upwardly under control of the motor M, the upper section 450, Fig. 3, of the slide 12 engages the movable member 451 of the limit switch 337 which is fixed to the standard 2a to thereby open the holding circuit of the coil 332 at the fixed contacts of the limit switch 337. In so doing, the coil 332 is deenergized and there is resultant discontinuation of the operation of motor M. In case the supporting frame F is moving downwardly and the operator neglects to open the stop switch 335, a member 452, Fig. 3, secured to the nut 11 engages the movable member 453 of the limit switch 341 which is fixed to the standard 2a to open the fixed contacts thereof whereby the holding circuit of the coil 331 is deenergized with consequent discontinuation of operation of the motor M.

After the printing plate P1 has been moved to a desired position under control of the supporting frame F in the manner described above and while the backboard remains in rear vertical position, it becomes necessary to shift said backboard B either toward the right or left so as to bring a desired section of the sensitized surface opposite said printing plate P1. To this end, if the backboard B is to be moved toward the right, when viewed as in Fig. 1, the switch 369, Figs. 1 and 17, is closed to thereby complete through the coil 363 a circuit which leads from the line L1, conductor 368 including the contacts of said switch 369, the coil 363, conductor 366 including the contacts of the normally closed limit switch 367, conductor 364 including the contacts of the normally closed switch 365, conductor 333 and thence to the line L3 by way of the conductor 302 which includes the contacts of the closed switch 303. When the coil 363 is thus energized, it attracts the armature 363a and closes the movable contacts of the conductors 374, 375 and 376 onto the respective, fixed contacts of the conductors 377, 378 and 379.

In so doing, there is established a locking circuit for holding the coil 363 energized after the switch 369 opens upon manual release thereof. This locking circuit extends from the line L1 by way of the conductor 368, conductor 368, conductor 378, conductor 375, the winding of the coil 363, conductor 366 including the fixed contacts of the normally closed limit switch 367, conductor 364 including the contacts of the normally closed switch 365, conductor 333, and thence to the line L3 by way of the conductor 302 which includes the contacts of the closed limit switch 303.

As stated, one terminal of the motor M1 is permanently closed to the line L2 by the conductor 390. The above noted closure of the armature 363a causes the conductors 386, 376 to be closed to the line L3 by way of the conductors 379 and 389. At the same time, the conductors 387, 374 are closed at the line L1 by way of the conductors 377, 388 and 369.

Accordingly, in response to closure of its operating circuit as just described, the armature of the motor M1 rotates in the proper direction to cause movement of the backboard B toward the right, as viewed in Fig. 1, under the direct control of the operating screw shaft 71. When the backboard B has been moved approximately tot its intended position, the stop switch 365 is manually operated to open the above described holding circuit for the coil 363. In response to opening of this circuit, said coil 363 is deenergized with consequent release of its armature 363a whereby the operating circuit of the motor M1 is opened. As a result, operation of said motor M1 is discontinued and, at this time, by manipulation of the hand wheel 94, the desired position of the backboard B may be attained with precision.

If it had been necessary to move the backboard B toward the left as viewed in Fig. 1, the switch 373, Figs. 1 and 17, is closed to thereby complete through the coil 362 a circuit which leads from the line L1, by way of conductor 368, conductor 372 including the contacts of said switch 373, the winding of coil 362, conductor 370 including the contacts of the normally closed limit switch 371, conductor 364, including the contacts of the normally closed switch 365, conductor 333 and thence to the line L3 by way of the conductor 302 which includes the contacts of the closed limit switch 303. When the coil 362 is thus energized, it attracts its armature 362a and closes the movable contacts of conductors 380, 381 and 382 onto the respective fixed contacts of the conductors 383, 384 and 385.

In so doing, there is established a locking circuit for holding the coil 362 energized after the switch 373 opens after the pressure thereon is released. This locking circuit extends from the line L1 by way of the conductor 368, conductor 380, conductor 388a, conductor 384, conductor 381, the winding of the coil 362, conductor 370 including the contacts of the normally closed limit switch 371, conductor 364 including the contacts of the normally closed switch 365, conductor 333 and thence to the line L3 by way of the conductor 302 which includes the contacts of the closed limit switch 363.

As stated, one terminal of the motor M1 is permanently closed to the line L2 by the conductor 390. The above noted closure of the armature 362a causes the conductors 306, 308 to be closed to the line L1 by way of the conductors 303, 303a, 305 and 300. At the same time, the conductors 307, 302 are closed to the line L3 by way of the conductors 306 and 309.

Accordingly, in response to closure of the operating circuit of the motor M1, the armature thereof rotates in the proper direction, the opposite of that described above, to cause movement of the backboard B toward the left, as viewed in Fig. 1, under the direct control of the operating screw 71. When the backboard B has reached its approximate intended position, the stop switch 365 is opened to deenergize the above described holding circuit for the coil 362. In response to opening of this circuit, the coil 362 is deenergized with consequent release of its armature 362a. As a result, the operating circuit of the motor M1 is opened and, at this time, by manipulation of the hand wheel 94, the desired exact position of the backboard B may readily be obtained.

The limit switches 307 and 371, Figs. 1, 16 and 17, are provided so that excessive movement of the backboard B either to the right or the left may be avoided. Thus, if the operator neglects to open the stop switch 364 while the backboard B is traveling toward the right under control of the motor M1, a member 454 secured to the carriage 68 engages the movable member 455 of the limit switch 367 which is fixed to the extension 1a to thereby open the holding circuit of the coil 363 at the fixed contacts of the limit switch 367. In so doing, the coil 363 is deenergized and there is resultant discontinuation of operation of the motor M1. In case the backboard B is traveling toward the left and the operator neglects to open the stop switch 364, member 456 secured to the carriage 68 engages the movable member 457 of the limit switch 371 which is fixed to the extension 1a to thereby open the holding circuit of the coil 362 at the fixed contacts of the limit switch 371 with resultant cessation of operation of the motor M1.

After the height of the printing plate P1 has been selected, and after the right-left position of the backboard B has been selected all as described above, it becomes necessary to move the backboard toward the front of the machine to thereby bring the sensitized surface into engagement with the printing plate.

As herein indicated, the backboard B has a rear vertical position wherein the sensitized surface carried thereby is spaced from the printing plate P1. The oscillatable shaft 151 has two diverging arms 458 and 459 fixed thereto, the arm 458, when the backboard B is in rear position being in engagement with the operating member of the limit switch 307 to thereby hold open the circuit through the fixed contacts thereof. The backboard B also has a forward vertical position—printing position—wherein the sensitized surface carried thereby is in engagement with the printing plate P1. When the backboard B is positioned as last stated, the arm 459 is in engagement with the operating member of the limit switch 303 to thereby hold open the circuit through the fixed contacts thereof as shown in Fig. 16.

Accordingly, when the backboard B is in its rear position, the condition of the control circuits for all of the motors M, M1 and M2 is as shown in Fig. 17 and, in this connection, it is to be noted that, for the rear position of the backboard B, the limit switch 307 is open and the limit switch 303 is closed.

In order to move the backboard B toward the front of the machine, the switch 305, Figs. 1 and 17, is closed momentarily to thereby complete through the coil 301 a circuit which leads from the line L1, by way of the conductor 304 including the contacts of said switch 305, the coil 301, and thence back to the line L3 by way of the conductor 302 which includes the contacts of the closed limit switch 303. When the coil 301 is thus energized, it attracts its armature 301a and closes the movable contacts of the conductors 311, 312 and 313 onto the respective fixed contacts of the conductors 314, 315 and 316.

In so doing, there is established a locking circuit for holding the coil 301 energized after the switch 305 opens. This locking circuit extends from the line L1 by way of the conductor 304, conductor 306, conductor 325, conductor 315, conductor 312, the coil 301, and thence back to the line L3 by way of the conductor 302 which includes the contacts of the closed limit switch 303.

As hereinbefore stated, one terminal of the motor M2 is permanently closed to the line L2 by the conductor 326. The above noted closure of the armature 301a causes the conductors 329, 313 to be closed to the line L3 by way of the conductors 316, 327 and 302. At the same time, the conductors 324, 311 are closed to the line L1 by way of the conductors 314, 325, 306 and 304.

Accordingly, in response to closure of its operating circuit as just described, the armature of the motor M2 rotates in the proper direction to impart a step of oscillatory movement in a clockwise direction to the shaft 151, Fig. 16, energy being transferred to said shaft 151 through the disks 154, 153 which operate in the manner hereinbefore specifically described. Such oscillatory movement of the shaft 151 causes quick movement of the backboard B from rear to forward position and this movement of the shaft 151 causes the arm 458 to recede from the limit switch 307, the operating member of the latter immediately and automatically closing the circuit through said limit switch fixed contacts. A moment later, the arm 459 engages and moves the operating member of the limit switch 303 to thereby open the circuit through the fixed contacts thereof.

When the limit switch 303 is thus opened, the above described holding circuit for the coil 301 was opened and, consequently, the armature 301a moves to the position shown in Fig. 17 with resultant discontinuation of operation of the motor M2. This happens just as the backboard reaches its front or printing position and is an important advantage and feature of the present invention.

Further, as hereinbefore described in detail, the operating and holding circuits for the set of coils 331, 332 for the motor M together with the set of coils 362, 363 for the motor M1 extend in each instance through the limit switch 303. Accordingly, when said limit switch 303 was opened as just described, the motors M and M1 were rendered non-operative. Therefore, when the backboard B is in front position, i. e., with the sensitized surface thereof in engagement with the printing plate P1, the machine is fool-proof in the sense that the printing plate may not be moved upward or downward. Neither may the backboard B be moved to the right or left.

Damage to the parts is thereby prevented even though someone should operate the switches 339, 343, 369 or 373. This is a very important feature of the present invention.

Opening of the limit switch 303 also rendered the coil 301 non-operative so that the motor M2 may not be operated to produce forward movement of the backboard B. However, closing of the limit switch 307 as last described placed the heretofore non-operative coil 300 in operative condition so that, when the switch 309 is closed, the backboard B may be moved to its rear position, the operating circuit for coil 300 extending from the line L1 by way of the conductor 304, conductor 308 including the upper contacts of switch 310 and the fixed open contacts of switch 309, coil 300, conductor 306 including the closed contacts of limit switch 307, and thence to the line L3 by way of the conductor 302.

As described in detail in U. S. Letters Patent No. 2,174,726, movement of the backboard B to front or printing position places a sealing ring arrangement under compression whereby the printing plate is enclosed in a sealed chamber. In accordance with standard practice in the photocomposing machine art, this sealed chamber should be evacuated prior to the time that the light exposure is effected so that the contact between the printing plate and the sensitized surface may be close and intimate. To this end, as shown in Fig. 1, the open end of a rubber tube 460 is associated with a rigid tube communicating with the interior of the aforesaid sealed chamber. At its other end, the tube 460 is connected to a pipe 461 having included therein the control valve 462, said pipe having an air pressure gauge associated therewith and said pipe leading to any suitable air exhausting pump, not shown.

The aforesaid valve 462, which when open, permits passage of air from the aforesaid sealed chamber toward the recited pump, is controlled by a handle 463 and, in accordance with the invention, this handle is utilized for controlling some of the disclosed operating circuits in a desirable and highly advantageous manner.

Thus, in the form of the invention herein shown, the aforesaid vacuum valve handle 463 comprises two operating sections 463a and 463b, the operating section 463a being coactable with the aforesaid switch 310 and the operating section 463b being coactable with the aforesaid switch 400. When the vacuum valve handle is in actuated position so that the "vacuum is on," the operating arrangement of the switch 310 has been moved from the position shown in Fig. 17 so that the upper contacts are open and the lower contacts are closed. Further, when the vacuum valve handle is in actuated position as just stated, the fixed contacts of the switch 400 are closed.

Inasmuch as the upper contacts of the switch 310 are open when the vacuum valve handle is in actuated position, it results that the above described operating circuit of the motor M2 through the coil 300 is open. Therefore, when the "vacuum is on," the backboard B may not be moved to its rear position even though the switch 309 is actuated. This is a safety feature of importance because, obviously, damage to the parts would result if the backboard B was moved rearwardly while the sealed chamber for the printing plate is evacuated.

Inasmuch as the lower contacts of the switch 310 are closed when the vacuum handle is in actuated position, it results that a circuit is closed from Line L1, by way of conductor 304, conductor 308, conductor 329 including the lower contacts of switch 310 and the lamp 330, and thence to line L3 by way of the conductor 302. The use of this lamp 330 is optional. However, when used, it should be of a significant color so as to afford an indication, when energized, that the machine is under vacuum and in condition for printing.

When the aforesaid vacuum valve handle is in actuated position, the switch 400 is closed as stated. The closure of this switch prepares a circuit for the energization of the printing lamp and the timer motor. Until the switch 400 is closed, such printing lamp and timer motor may not be operated.

In Fig. 18, it will be noted that the coils 413, 414 and 407 are deenergized. The timer arm 442 is in engagement with the limit switch 411 and the fixed contacts thereof are held open. The other limit switch 409 is closed.

Under these circumstances, when the switch 400, Fig. 17, has been closed as just described, the switch 404, Figs. 1 and 18, may be operated manually to move its plunger from right to left whereby a circuit is extended from line L2 by way of conductor 412, the arm of switch 403 at the left, switch contact 403a, conductor 401, the contacts of switch 400, conductor 402, contact 404b, contact 404a, conductor 408, the closed contacts of limit switch 409, conductor 419, coil 413, conductor 417, and thence to the line L1 by way of conductor 418. In response to energization of the circuit just described, the coil 413 is energized with resultant movement of the armature arrangement 415 in a counterclockwise direction, Fig. 18, whereby the movable contacts of the conductors 421, 422, 423 and 424 are brought into engagement with the respective fixed contacts of the conductors 425, 426, 427 and 428.

When this happens, a locking circuit is established for the coil 413, this circuit extending from the line L2 by way of conductor 412, conductor 421, conductors 425 and 408, the closed contacts of limit switch 409, conductor 419, the coil 413, conductor 417 and thence to the line L1 by way of the conductor 418.

In response to the above described movement of the armature arrangement 415, circuits are completed through the field coils of the timer motor M4. Thus, from the line L2, a circuit extends by way of conductor 412, conductor 437a, the field winding between the motor terminals T3 and T1, conductor 426, conductor 422, and thence to the line L1 by way of the conductor 418. The circuit which includes the other field coil of the timer motor M4 extends from the line L2 by way of the conductor 412, conductor 421, conductor 424, conductor 428, conductor 437, the field coil included between the contacts T4 and T2, the conductor 427, conductor 423, conductor 422 and thence to the line L1 by way of the conductor 418.

The coil 407 is energized as a result of the energization of the aforesaid coils 413 and 414. To this end, from the line L2, a circuit extends by way of the conductor 412, the arm of switch 403 at the right, contact 403b of switch 403, conductor 406, the coil 407, conductor 438, conductor 435, conductor 426, conductor 422, and thence to the line L, by way of the conductor 418. When the coil 407 is thus energized, it attracts its armature 407a and closes the movable contacts of the conductors 431 and 432 onto the respective conductors 439 and 440. In so doing, a circuit is completed through the printing lamp La which extends from line L2 by way of conductor 412, conductor 432, conductor 440, the electrodes of the printing lamp La, conductor 439, conductor 431 and thence to the line L1 by way of conductor 418.

Accordingly, as well understood in the art, the timer motor M4 and the printing lamp La are energized simultaneously, the printing lamp having been moved to printing position on the support 464 so that the light beam therefrom may be directed through the printing plate P1 and onto the sensitized surface.

As soon as operation of the motor M4 is initiated the timer arm 442 thereof starts moving in a counterclockwise direction from the broken line position thereof shown in Fig. 18. As a result, the limit switch 411 automatically closes, operation of the timer motor M4 continuing until the timer arm 442 engages the limit switch 409 to thereby open the contacts thereof and open the holding circuits for the coil 413. When this happens, the armature arrangement 415 moves to the position shown in Fig. 18 and, as a result, the circuits of the motor M4 and the printing lamp La are opened. The limit switch 409 is now held open by the timer arm 442 while the limit switch 411 is closed. The coils 413, 414 and 407 together with the other parts of the circuit arrangement are in the condition shown in Fig. 18.

If the various parts had been in the position last noted, when the printing operation was to be effected, the switch 404, Figs. 1 and 18, would have been operated manually to move its plunger from right to left whereby a circuit would be extended from line L2 by way of conductor 412, the arm of switch 403 at the left, switch contact 403a, conductor 401, the contacts of switch 400, conductor 402, contact 404b, contact 404c, conductor 410, the closed contacts of limit switch 411, conductor 420, coil 414, conductor 417, and thence to the line L1 by way of conductor 418. In response to energization of the circuit just described, the coil 414 would be energized with resultant movement of the armature arrangement 415 in a clockwise direction, Fig. 18, whereby the movable contacts of the conductors 429, 430, 431 and 432 would be brought into engagement with the respective fixed contacts of the conductors 433, 434, 435 and 436.

When this happens, a locking circuit would be established for the coil 414, this circuit extending from the line L2 by way of conductor 412, conductor 432, conductor 436, conductor 410, the closed contacts of limit switch 411, conductor 420, the coil 414, conductor 417 and thence to the line L1 by way of the conductor 418.

In response to the above described movement of the armature arrangement 415, circuits would be completed through the field coils of the timer motor M4 in order to rotate the same in a direction opposite to the direction of rotation first noted. To this end, from the line L2, a circuit would be extended by way of conductor 412, conductor 437a, the field winding between the motor terminals T3 and T1, conductor 426, conductor 435, conductor 431 and thence to the line L1 by way of conductor 418. The circuit which includes the other field coil of the timer motor M4 would be extended from the line L2 by way of the conductor 412, conductor 432, conductor 430, conductor 434, conductor 427, the field winding included between the contacts T2 and T4 (this field winding being connected in a sense the reverse of that first noted), conductor 437, conductor 433, conductor 429, conductor 431 and thence to the line L1 by way of the conductor 418.

In generally the same manner as heretofore described, the coil 407 would be energized in response to energization of the coil 414. Thus, from the line L2 a circuit would be extended by way of the conductor 412, the arm of switch 403 at the right, contact 403a of switch 403, conductor 406, the coil 407, conductor 438, conductor 435, conductor 431, and thence to the line L1 by way of the conductor 418. When the coil 407 is thus energized, the printing lamp La would be energized over the same circuit hereinbefore described in order for the printing operation to proceed.

In the preceding description, it has been pointed out that the coils 413, 414 control operation of the timer motor M4 and the printing lamp La. It has also been pointed out that the operating circuits for these coils extend through the contacts of the switch 400. Therefore, unless the switch 400 is closed by coaction thereon of the vacuum valve handle, it is impossible to operate the timer motor and the printing lamp. In other words, the timer motor and printing lamp may not be actuated unless the vacuum is "on."

After the timer motor has operated a limit switch to close the circuit of the coil 413 (or 414) as described above, the exposure is completed. At this time, the vacuum valve handle 463 is returned to its non-operative positive whereupon the switches 310 and 400 automatically return to the respective positions thereof shown in Fig. 17. In so doing, the lamp 330 is extinguished, the operating circuit of the coil 300 is prepared at the upper contacts of the switch 310, and the operating circuit of the coils 413, 414 is broken at the switch 400.

After the tube 460 is removed to break the vacuum connection, the mechanism is in condition for return of the backboard B to its rear position. To this end, the switch 309, Figs. 1 and 17, is closed to thereby complete through the coil 300 a circuit which extends from the line L1, by way of the conductor 304, conductor 308 including the upper contacts of switch 310, the contacts of switch 309, the coil 300, conductor 306 including the contacts of the closed limit switch 307, and thence back to the line L3 by way of the conductor 302. When the coil 300 is thus energized, it attracts its armature 300a and closes the movable contacts of the conductors 317, 318 and 319 onto the respective fixed contacts of the conductors 320, 321 and 322.

In so doing, there is established a locking circuit for holding the coil 300 energized after the switch 309 opens. This locking circuit extends from the line L1 by way of the conductor 304, conductor 308, conductor 325, conductor 326, conductor 321, conductor 318, the coil 300, conductor 306 including the contacts of the closed limit switch 307, and thence back to the line L3 by way of the conductor 302.

As stated, one terminal of the motor M2 is permanently closed to the line L2 by the conductor 328. The above noted closure of the armature 300a causes the conductors 323, 317 to be closed to the line L1 by way of the conductors 320, 326, 325, 308 and 304. At the same time, the conductors 324, 319 are closed to the line L3 by way of the conductors 322, 327 and 302.

Accordingly, in response to closure of its operating circuit as just described, the armature of the motor M2 rotates in the proper direction, the opposite of that hereinbefore described, to impart a step of oscillatory movement in a counterclockwise direction to the shaft 151, Fig. 16, energy being transferred to said shaft 151 through the disks 154, 153 which operate in the manner hereinbefore specifically described. Such oscillatory movement of the shaft 151 causes quick movement of the backboard B from forward to rear position and this movement of the shaft 151 causes the arm 459 to recede from the limit switch 303 and the arm 458 to engage the operating member of the limit switch 307.

Accordingly, the limit switch 303 automatically moves to closed position to reestablish the forward circuit for the motor M2 which moves the backboard B forward to reestablish the circuits of the motors M and M1. By the arm 453, the limit switch 307 is opened to discontinue operation of the motor M2 as the backboard B reaches its rearward position.

The return of the backboard B to its rear position completes the cycle of operation. Thereafter, by operations the same as hereinbefore described, subsequent exposures are completed one-by-one on different sections of the sensitized surface 240.

As shown in Fig. 5, the timer motor arrangement comprises a suitable supporting base mounted on the right wing section 1a, Fig. 1. The base carries a housing which has the limit switch 409 fixed therein. The limit switch 411 is mounted on a ring 465, the position of which may be determined by a pin 466. As well understood in the art, the position of the limit switch 411 may be adjusted as desired to vary the length of exposure periods of the lamp La.

The hereinbefore described switch 403, when utilized, may be and preferably is mounted on the side extension 1a of the base 1 at the right of Fig. 1.

Operation of the switch 403 to move the switch arms from the respective contacts 403a, 403c to the contacts 403b, 403d, respectively, during a period when the timer motor M4 and lamp La are operating causes deenergization of the coil 413 (or 414) because the current supply is broken at the contact 403a. When this happens, the timer motor continues operating (because of its holding circuit) until the arm 442 reaches the end of its stroke. However, the lamp La is extinguished when the switch 403 is operated as just described. This constitutes an optional way of shortening a period of exposure of the lamp La.

If the arm 442 of the timer motor arrangement is in engagement with the fixed limit switch 409, it is obvious that adjustment may be effected as desired of the adjustable limit switch 411. However, with the arm 442 in engagement with the adjustable limit switch 414, the stroke of the arm 442 may not be shortened in the absence of special measures. If such special measures are to be taken, the switch arms of the switch 403 are moved from the respective contacts 403a, 403c to the contacts 403b, 403d, respectively. When this is done, a circuit is completed from line L2 by way of conductor 412, contact 403b, conductor 405, contact 404d, the conductive bridge of switch 404 positioned as shown in Fig. 18, contact 404e, conductor 410, the contacts of limit switch 411, conductor 420, the coil 414, conductor 417, and thence to line L1 by way of conductor 418. Accordingly, the coil 414 is energized to attract the armature arrangement 415 in a clockwise direction, Fig. 18, whereby the hereinbefore described locking circuit for the coil 414 is completed, the motor M4 becoming operative to move the arm 442 from the limit switch 411 and into engagement with the limit switch 409. When this has been done, the position of the limit switch 411 may be adjusted as desired. During the operation of the timer motor last described, the lamp La is not illuminated because the circuit of the coil 407 is open at the contact 403c.

It will be understood that the switches 305, 309, 339, 343, 335, 369, 373 and 365 are of the type which are to be operated manually by finger pressure. The closing or opening periods of these switches, as the case may be, need be only of momentary duration. Normally, the switches 305, 309, 339, 343, 369 and 373 remain open whereas the switches 335 and 365 normally remain closed. The switch 310 normally maintains its upper contacts closed, the switch 400 is normally open and the switch 404, normally, takes the position shown in Fig. 18. It will be understood that the various operating switches together with the lamp 330 are conveniently grouped at the front of the machine, for example, as shown in Fig. 1.

It will be understood that each of the various armatures 331a, 332a, 362a, 363a, 309a, 301a and 415 comprises a conductive part and an insulating part as indicated.

While the invention has been described with respect to a certain particular preferred example which gives satisfactory results, it will be understood by those skilled in the art after understanding the invention, that various changes and modifications may be made without departing from the spirit and scope of the invention and it is intended therefore in the appended claims to cover all such changes and modifications.

What is claimed as new and desired to be secured by Letters Patent is:

1. In a photocomposing machine, means for supporting a sensitized surface in a vertical plane, means for supporting a printing plate in a vertical plane, an electrical motor, means whereby said motor moves said sensitized surface either to one position where it is closely adjacent said printing plate or to another position where it is spaced from said printing plate, means whereby a sealed chamber is formed at the printing plate when the sensitized surface is in said first named position, means for automatically discontinuing the action of said motor on said sensitized surface as said sealed chamber is formed, and means for evacuating said sealed chamber.

2. In a photocomposing machine, means for supporting a sensitized surface, means for supporting a printing plate in a plane spaced from the plane of said sensitized surface, a compressible sealing ring cooperative with said printing plate and projecting toward said sensitized surface, a motor for moving said sensitized surface toward said printing plate and, in so doing, causing said sensitized surface to engage said sealing ring and form a sealed chamber around said printing plate, means for automatically discontinuing the action of said motor on said sensitized surface as said sealed chamber is formed, and means for evacuating said sealed chamber whereby intimate contact is effected between said sensitized surface and said printing plate.

3. In a photocomposing machine, means for supporting a sensitized surface, means for supporting a printing plate adjacent said sensitized surface, a compressible sealing ring disposed around said printing plate and projecting toward said sensitized surface, an electrical motor, means whereby said motor moves said sensitized surface toward said printing plate and into engagement with said sealing ring to thereby form a sealed chamber, a switch automatically operable to open the circuit of said motor as said sealed chamber is formed, and means for evacuating said sealed chamber.

4. In a photocomposing machine, means for supporting a sensitized surface, means for supporting a printing plate adjacent said sensitized surface, a compressible sealing ring disposed around said printing plate and projecting toward said sensitized surface, an electrical motor, means whereby said motor moves said sensitized surface toward said printing plate and into engagement with said sealing ring to thereby form a sealed chamber, a switch automatically operable to open the circuit of said motor as said sealed chamber is formed, means for evacuating said sealed chamber, means for opening said sealed chamber to the atmosphere, means whereby said motor moves said sensitized surface to a position spaced from said printing plate, and a second switch automatically operable to open the circuit of said motor as said sensitized surface reaches said last named position.

5. In a photocomposing machine, means for supporting a sensitized surface in a vertical position, means for supporting a printing plate adjacent said sensitized surface, means for effecting relative movement between said sensitized surface and said printing plate, a compressible sealing ring disposed around said printing plate and projecting toward said sensitized surface, an electrical motor, means whereby said motor moves said sensitized surface toward said printing plate and into engagement with said sealing ring to thereby form a sealed chamber, a switch automatically operable to open the circuit of said motor as said sealed chamber is formed, and means for evacuating said sealed chamber.

6. In a photocomposing machine, means for supporting a sensitized surface in a vertical plane, means for supporting a printing plate in an adjacent vertical plane, means for moving said sensitized surface along a horizontal path with respect to said printing plate, a compressible sealing ring disposed around said printing plate and projecting toward said sensitized surface, an electrical motor, means whereby said motor moves said sensitized surface toward said printing plate and into engagement with said sealing ring to thereby form a sealed chamber, means for automatically discontinuing the action of said motor on said sensitized surface as said sealed chamber is formed, and means for evacuating said sealed chamber whereby intimate contact is effected between said sensitized surface and said printing plate.

7. In a photocomposing machine, means for supporting a sensitized surface in a vertical plane, means for supporting a printing plate in a vertical plane, an electrical motor, means whereby said motor moves said sensitized surface from a position where it is spaced from said printing plate to a position where it is closely adjacent said printing plate, means whereby a sealed chamber is formed at the printing plate when the sensitized surface is in said last named position, means for automatically discontinuing the action of said motor on said sensitized surface as said sealed chamber is formed, and means for evacuating said sealed chamber.

8. In a photocomposing machine, means for supporting a sensitized surface in a vertical plane, means for supporting a printing plate in a vertical plane, an electrical motor, a switch adapted to be closed to complete the operating circuit of said motor, means for holding closed the operating circuit of said motor after said switch has opened, means whereby said motor moves said sensitized surface from a position where it is spaced from said printing plate to a position where it is closely adjacent said printing plate, means whereby a sealed chamber is formed at the printing plate when the sensitized surface is in said last named position, means for automatically discontinuing the action of said motor on said sensitized surface as said sealed chamber is formed, and means for evacuating said sealed chamber.

9. In a photocomposing machine, means for supporting a sensitized surface in a vertical plane, means for supporting a printing plate in a vertical plane, an electrical motor, means whereby said motor moves said sensitized surface from a position where it is spaced from said printing plate to a position where it is closely adjacent said printing plate, means whereby a sealed chamber is formed at the printing plate when the sensitized surface is in said last named position, means for automatically discontinuing the action of said motor on said sensitized surface as said sealed chamber is formed, said last named means comprising mechanism for opening the operating circuit of said motor together with an arrangement whereby said motor actuates the circuit-opening mechanism, and means for evacuating said sealed chamber.

10. In a photocomposing machine, means for supporting a sensitized surface in a vertical plane, means for supporting a printing plate in a vertical plane, an electrical motor, means whereby said motor operates in one direction to move said sensitized surface from a position where it is spaced from said printing plate to a position where it is closely adjacent said printing plate, means for preparing another circuit adapted to operate said motor in reverse direction, means whereby said motor actuates said circuit-preparing means, means whereby a sealed chamber is formed at the printing plate when the sensitized surface is in said last named position, means for automatically discontinuing the action of said motor on said sensitized surface as said sealed chamber is formed, and means for evacuating said sealed chamber.

11. In a photocomposing machine, means for supporting a sensitized surface in a vertical plane, means for supporting a printing plate in a vertical plane spaced from said first named plane, means for effecting relative movement between said sensitized surface and said printing plate while they are disposed in spaced relation, an electrical motor, means whereby said motor moves said sensitized surface from a position where it is spaced from said printing plate to a position where it is closely adjacent said printing plate, means whereby a sealed chamber is formed at the printing plate when the sensitized surface is in said last named position, means for automatically discontinuing the action of said motor on said sensitized surface as said sealed chamber is formed, means for rendering said third named means non-operative as said sensitized surface reaches said last named position, and means for evacuating said sealed chamber.

12. In a photocomposing machine, means for supporting a sensitized surface in a vertical plane, means for supporting a printing plate in a vertical plane spaced from said first named plane, means for moving said sensitized surface in a horizontal direction while spaced from said printing plate, an electrical motor, means whereby said motor moves said sensitized surface from a position where it is spaced from said printing plate to a position where it is closely adjacent said printing plate, means whereby a sealed chamber is formed at the printing plate when the sensitized surface is in said last named position, means for automatically discontinuing the action of said motor on said sensitized surface as said sealed chamber is formed, means for rendering said third named means non-operative as said sensitized surface reaches said last named position, and means for evacuating said sealed chamber.

13. In a photocomposing machine, means for supporting a sensitized surface in a vertical plane, means for supporting a printing plate in a vertical plane spaced from said first named plane, means for moving said printing plate in a vertical direction while spaced from said sensitized surface, an electrical motor, means whereby said motor moves said sensitized surface from a position where it is spaced from said printing plate to a position where it is closely adjacent said printing plate, means whereby a sealed chamber is formed at the printing plate when the sensitized surface is in said last named position, means for automatically discontinuing the action of said motor on said sensitized surface as said sealed chamber is formed, means for rendering said third named means non-operative as said sensitized surface reaches said last named position, and means for evacuating said sealed chamber.

14. In a photocomposing machine, means for supporting a sensitized surface in a vertical plane, means for supporting a printing plate in a vertical plane, an electrical motor, means whereby said motor moves said sensitized surface from a position where it is spaced from said printing plate to a position where it is closely adjacent said printing plate, means whereby a sealed chamber is formed at the printing plate when the sensitized surface is in said last named position, means for automatically discontinuing the action of said motor on said sensitized surface as said sealed chamber is formed, means for evacuating said sealed chamber, means whereby said motor moves said sensitized surface to a position where it is spaced from said printing plate, and means whereby said last named means is rendered non-operative by operation of said evacuating means.

ALEXANDER T. KOPPE.